United States Patent
Atherton et al.

(10) Patent No.: US 11,579,622 B2
(45) Date of Patent: Feb. 14, 2023

(54) SYSTEMS AND METHODS FOR UTILIZING IMAGES TO DETERMINE THE POSITION AND ORIENTATION OF A VEHICLE

(71) Applicant: Amazon Technologies, Inc., Seattle, WA (US)

(72) Inventors: John Alan Atherton, Lake Forest Park, WA (US); Aziz Umit Batur, Seattle, WA (US); Kishor Dilip Bhalerao, Seattle, WA (US); Haresh Karnan, Austin, TX (US); Harshavardhan Shirolkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 16/779,380

(22) Filed: Jan. 31, 2020

(65) Prior Publication Data
US 2021/0240195 A1    Aug. 5, 2021

(51) Int. Cl.
*G05D 1/02* (2020.01)
*G05D 1/00* (2006.01)
*G01C 21/00* (2006.01)

(52) U.S. Cl.
CPC ......... *G05D 1/0246* (2013.01); *G05D 1/0038* (2013.01); *G05D 1/0274* (2013.01); *G01C 21/005* (2013.01)

(58) Field of Classification Search
CPC .. G05D 1/0246; G05D 1/0038; G05D 1/0274; G01C 21/005; G01C 21/28; G01C 21/30; G01C 21/3602; G01C 21/3804; G01C 21/1656; G01C 21/3819–3826; G06V 2201/10; G06V 10/44; G06V 20/10; G06V 20/70
See application file for complete search history.

(56) References Cited

U.S. PATENT DOCUMENTS

2015/0202770 A1    7/2015 Patron et al.
2018/0004224 A1*   1/2018 Arndt ................... G05D 1/0221
(Continued)

FOREIGN PATENT DOCUMENTS

WO    2018104563 A2    6/2018

OTHER PUBLICATIONS

Grompone von Gioi, R. et al., LSD: A Fast Line Segment Detector with a False Detection Control, IEEE Transactions on Pattern Analysis and Machine Intelligence 32.4 (2010): 722-732, 11 pages.
(Continued)

*Primary Examiner* — Bao Long T Nguyen
(74) *Attorney, Agent, or Firm* — Athorus, PLLC

(57) ABSTRACT

Described are systems and methods to utilize images to determine the position and/or orientation of a vehicle (e.g., an autonomous ground vehicle) operating in an unstructured environment (e.g., environments such as sidewalks which are typically absent lane markings, road markings, etc.). The described systems and methods can determine the vehicle's position and orientation based on an alignment of annotated images captured during operation of the vehicle with a known annotated reference map. The translation and rotation applied to obtain alignment of the annotated images with the known annotated reference map can provide the position and the orientation of the vehicle.

19 Claims, 17 Drawing Sheets

(56) References Cited

U.S. PATENT DOCUMENTS

2019/0050648 A1* 2/2019 Stojanovic ............. G06V 20/13
2020/0098135 A1* 3/2020 Ganjineh ................. G06T 7/74
2020/0401817 A1* 12/2020 Schroeter ............... G06V 20/56

OTHER PUBLICATIONS

Isola, P. et al., Image-to-Image Translation with Conditional Adversarial Networks, CVPR 2017, http://openaccess.thecvf.com/content_cvpr_2017/papers/Isola_Image-To-Image_Translation_With_CVPR_2017_paper.pdf, 10 pages.

International Search Report and Written Opinion dated May 12, 2020, issued in corresponding International Application No. PCT/US2021/015315.

* cited by examiner

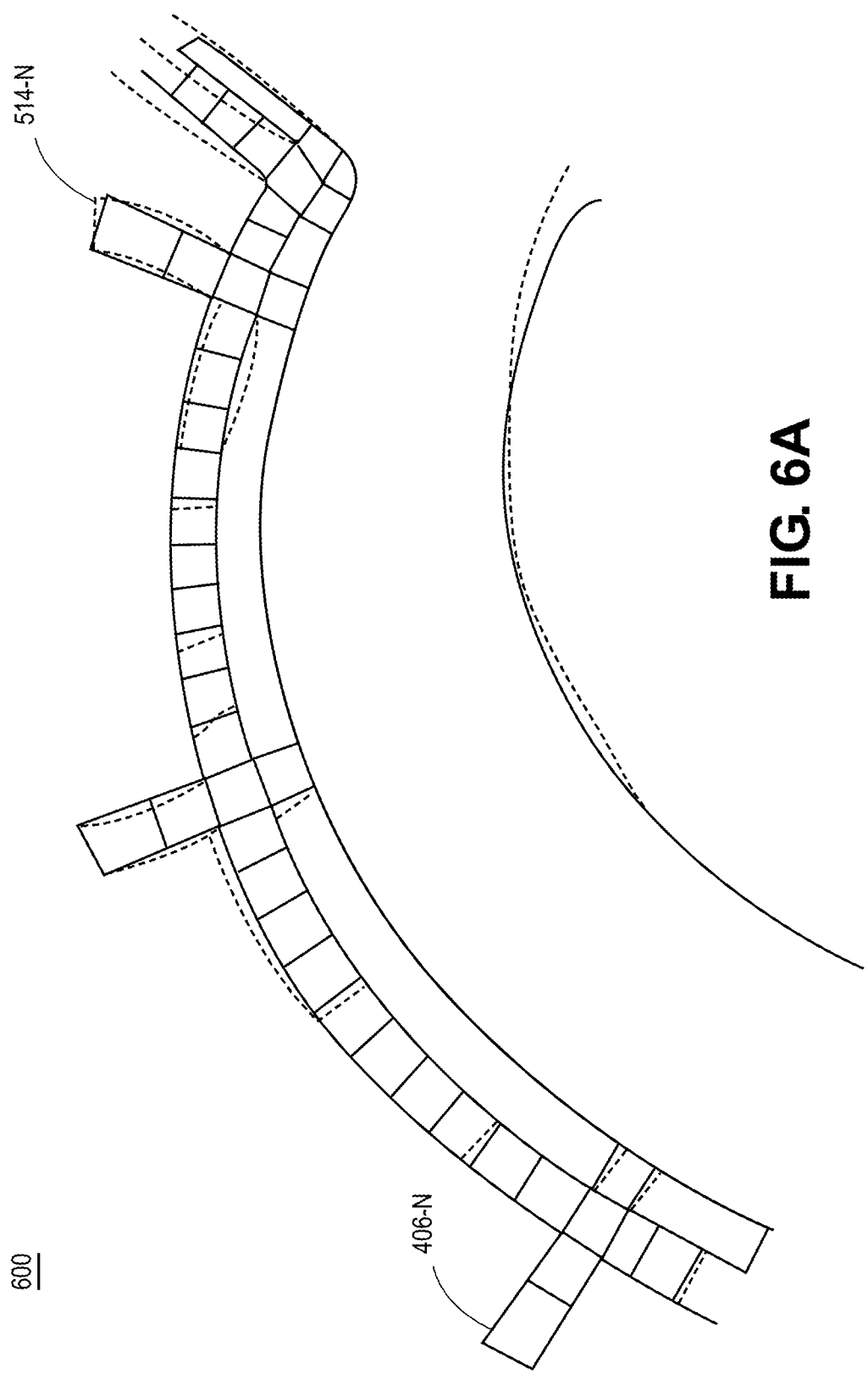

SYSTEMS AND METHODS FOR UTILIZING IMAGES TO DETERMINE THE POSITION AND ORIENTATION OF A VEHICLE

BACKGROUND

Autonomous ground vehicles, also referred to as unmanned ground vehicles or autonomous mobile robots, are being increasingly utilized. For example, autonomous ground vehicles are being utilized to deliver packages, food, etc., to perform surveys, to monitor traffic, to provide security or surveillance, etc. To facilitate operation of the autonomous ground vehicle through an environment, autonomous ground vehicles typically include navigational systems that can measure and/or estimate navigational information, such as, e.g., a vehicle's position, orientation, velocity, acceleration, etc. Many such navigational systems rely on Global Positioning System (GPS) transceivers for determining positional information using data received from one or more orbiting satellites, or cellular transceivers configured to estimate (e.g., triangulate) a position using signals received from one or more cellular telephone network towers or other network sources. Nevertheless, GPS can be inaccurate, irrelevant, unreliable, unavailable, etc., in certain environments. Moreover, GPS may have a degree of accuracy or tolerance that may be insufficient for certain situations.

BRIEF DESCRIPTION OF THE DRAWINGS

FIGS. 6A and 6B are illustrations of an overlay of an annotated binary image over an annotated binary reference map.

DETAILED DESCRIPTION

Figure 1:
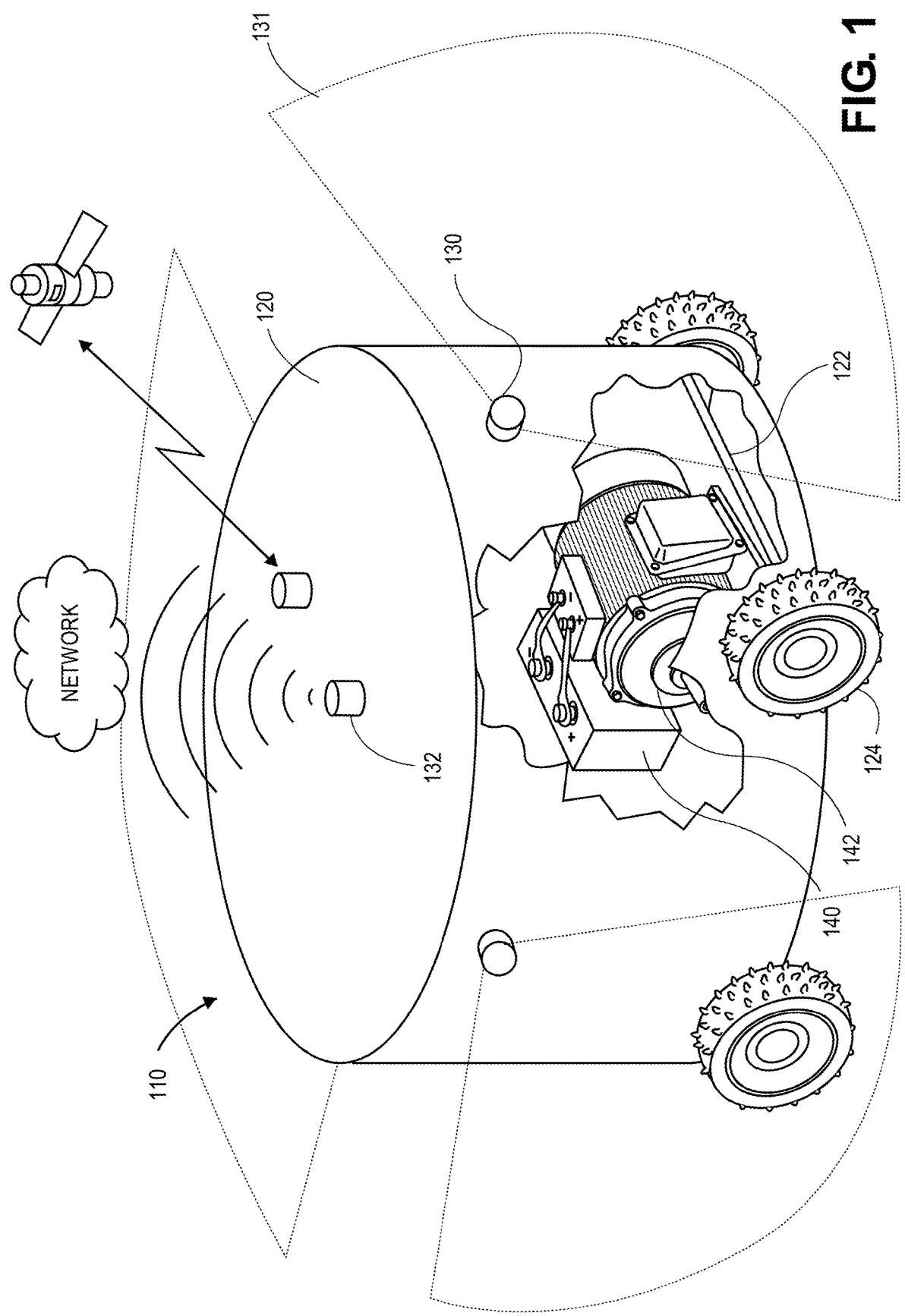
FIG. 1 is an illustration of an exemplary autonomous ground vehicle, in accordance with embodiments of the present disclosure.

As is set forth in greater detail below, embodiments of the present disclosure are generally directed to utilizing images to determine the position and/or orientation of a vehicle (e.g., an autonomous ground vehicle) operating in an unstructured environment (e.g., environments such as sidewalks which are typically absent lane markings, road markings, etc.). During operation of an autonomous ground vehicle, positional and orientation information is typically used to determine the path the autonomous ground vehicle is to follow in navigating to its destination. Although GPS is often used to determine the position and orientation of a vehicle, GPS can have various shortcomings. For example, the degree of accuracy provided by GPS is often insufficient, and GPS can be inaccurate, unreliable, and/or unavailable in certain environments. As an alternative and/or a supplement to existing systems, embodiments of the present disclosure can provide systems and methods for utilizing images (e.g., captured by imaging sensors provided aboard an autonomous ground vehicle), which can be processed and compared to an annotated reference map of the environment in which the autonomous ground vehicle is operating, to determine the pose (e.g., position and orientation) of the autonomous ground vehicle.

According to embodiments of the present disclosure, an annotated reference map of an environment in which the autonomous ground vehicle is operating can first be constructed. For example, images of the environment in which the autonomous ground vehicle is operating can be obtained (e.g., by aircraft, unmanned aerial vehicle, ground vehicles, etc.), and these images can be used to generate a two-dimensional reconstruction of the area (e.g., using photogrammetry, etc.). Thus, the position of each of the images and the resolution of the images used to generate the two-dimensional reconstruction of the environment is known.

After the two-dimensional reconstruction of the environment has been created, various environmental features in the environment can be detected and annotated. For example, environmental features on the ground, such as, e.g., cracks in a sidewalk, the edges of the sidewalk, a curb, the edge/boundary of a lawn or grassy area, the edge/boundary of a dirt, gravel, or unpaved area, the edge of a driveway, etc., can be detected, and the two-dimensional reconstruction can be annotated with line segments corresponding to the detected environmental features. As described herein, the detection and annotation of environmental features can be performed manually or by automated systems and/or processes. According to certain aspects of the present disclosure, the environmental features can be detected from an overhead bird's-eye view perspective. Alternatively, a camera can be virtually inserted into the representation of the environment to simulate the operation of an autonomous ground vehicle through the representation and the environmental features can be detected while simulating the operation of an autonomous ground vehicle through the representation of the environment. According to embodiments of the present disclosure, the environmental features can be detected manually, using line segment detectors (e.g., Canny, Line Segment Detector, etc.), detecting boundaries in a segmented semantic map, a trained network (e.g., a trained classifier, a machine learning system, a deep learning system, etc.), etc., or any combination thereof. The annotated map, which includes the line segments representing the detected environmental features, can serve as the annotated reference map of the environment. According to certain aspects of the present disclosure, the annotated reference map can be represented as a binary map, where the line segments, which correspond to the detected environmental features, can include non-zero values, and the remaining space can be represented as zero values.

An autonomous ground vehicle, during operation of the autonomous ground vehicle, can utilize the created annotated reference map to determine its position and/or orientation. Autonomous ground vehicles typically employ a multitude of various sensors to facilitate autonomous operation. For example, autonomous ground vehicles may include imaging sensors (e.g., cameras), laser sensors (e.g., LIDAR), thermal sensors, radar, accelerometers, gyroscopes, compasses, GPS receivers, etc. According to aspects of the present disclosure, imaging sensors of the autonomous ground vehicle may capture one or more images of the environment in which it is operating. For example, the imaging sensors can obtain one or more images, as the autonomous ground vehicle is moving, to provide a 360° panoramic view of the environment in which the autonomous ground vehicle is operating. Depth information associated with the one or more images can be determined and used to transform the perspective view images to a bird's-eye view image of the environment. According to certain aspects, multiple images of the environment, captured from different imaging sensors and from different positions as the autonomous ground vehicle is navigating along its route, may be combined in constructing the bird's-eye view image of the environment.

After the bird's-eye view image of the environment has been constructed, similar to the construction of the annotated reference map, various environmental features in the image can be detected and annotated. For example, environmental features on the ground, such as, e.g., cracks in a sidewalk, the edges of the sidewalk, a curb, the edge/boundary of a lawn or grassy area, the edge/boundary of a dirt, gravel, or unpaved area, the edge of a driveway, etc., can be detected, and the bird's-eye view image can be annotated with line segments corresponding to the detected environmental features. Alternatively, the environmental features can be detected in the image before the image(s) is transformed into the bird's-eye view image of the environment. According to certain aspects of the present disclosure, the environmental features can be detected and annotated manually, using line segment detectors (e.g., Canny, Line Segment Detector, etc.), a trained network (e.g., a trained classifier, a machine learning system, a deep learning system, etc.), etc., or any combination thereof. The annotated image, including the line segments representing the detected environmental features, can then be utilized in conjunction with the annotated reference map to determine the position and orientation of the autonomous ground vehicle. According to certain aspects, the annotated image can be represented as a binary map, where the line segments, which correspond to the detected environmental features, can include non-zero values, and the remaining space can be represented as zero values.

To determine the position of the autonomous ground vehicle, the relative translation and rotation utilized to align the annotated image to the annotated reference map can be determined and then be utilized to obtain the position and/or orientation of the autonomous ground vehicle. In aligning the annotated image to the annotated reference map, an initial relative positioning is performed based on odometry information that is received from the various sensors of the autonomous ground vehicle. For example, the initial alignment can be based on the autonomous ground vehicle's expected position and orientation based on the autonomous ground vehicle's planned route, distance travelled, time travelled, speed travelled, etc. The initial relative positioning can also consider previous alignments the autonomous ground vehicle may have achieved at different positions while operating in the environment. With the annotated image and the annotated reference map positioned in the initial relative positioning, an alignment score corresponding to the relative positioning of the annotated image to the annotated reference map can be determined.

The alignment score can include, for example, a summation of the distance for each non-zero pixel of the annotated image to the corresponding closest non-zero pixel in the annotated reference map, the number of non-zero pixels within a threshold distance, a ratio of non-zero pixels within a certain distance to non-zero pixels beyond a certain distance, etc., or any combination thereof. The alignment score can be compared against a threshold value, and if the alignment score is within an acceptable tolerance range, the annotated image can be considered to be aligned to the annotated reference map. If the alignment score is not within an acceptable tolerance range, the relative positioning of the annotated image to the annotated reference map can be adjusted, and a new alignment score can be determined for the new relative positioning. This process can be iteratively repeated until an alignment score corresponding to a positioning of annotated image and the annotated reference map indicates that alignment has been achieved.

Once alignment of the annotated image and the annotated reference map has been achieved, the translation and rotation applied to obtain alignment of the annotated image to the annotated reference map can be applied to the known position of the annotated reference map to determine the autonomous ground vehicle's position and/or orientation. Accordingly, the autonomous ground vehicle's position can include the position of annotated reference map adjusted by the translation applied to achieve alignment of the annotated image and the annotated reference map, and the orientation of the autonomous ground vehicle can include the angle applied to achieve alignment of the annotated image and the annotated reference map. Once the autonomous ground vehicle's position and/or orientation has been determined, the procedure can be repeated (e.g., continuously, periodically, or on-demand as the autonomous ground vehicle's position and/or orientation is desired, etc.) based on subsequent images captured by the autonomous ground vehicle while the autonomous ground vehicle operates in the environment.

According to certain embodiments, to reduce the computational load, certain strategies can be employed. For example, as different relative positionings are considered, the best positioning score can be stored, and as each successive alignment score is calculated for each subsequent relative positioning, the computation can terminate and move to the next relative positioning once the alignment score reaches the stored best alignment score (i.e., the alignment score cannot be any better than the stored best alignment score).

According to yet another embodiment of the present disclosure, once an alignment of the annotated image and the annotated reference map has been obtained, the previously obtained alignment can be utilized by the autonomous ground vehicle to more efficiently obtain subsequent alignments. For example, if an alignment $A_1$ of mage $I_1$ and the annotated reference map is obtained at position $D_1$, the autonomous ground vehicle can utilize alignment $A_1$ at subsequent positions (e.g., $D_2$) to more efficiently obtain alignment of the annotated images with the annotated reference map at subsequent positions. The autonomous ground vehicle can consider alignment $A_1$ and certain odometry information regarding the autonomous ground vehicle's operation from position $D_1$ (e.g., distance traveled, direction traveled, time traveled, etc.) to more efficiently obtain alignment of the annotated image with the annotated reference map.

According to certain aspects of the present disclosure, after the annotated reference map has been created, the annotated reference map can be processed to identify certain areas of interest in the annotated reference map. For example, the annotated reference map can be analyzed for areas where the detected environmental features (which can be represented by line segments) may make alignment of an annotated image with the annotated reference map difficult (e.g., a scarcity of detected environmental features, large areas of environmental features extending in a single direction, etc.). Additionally, the annotated reference map can be further annotated with supplemental information to identify areas of interest based on the difficulty that an autonomous ground vehicle may have experienced in aligning an annotated image with the annotated reference map.

FIG. 1 is an illustration of an exemplary autonomous ground vehicle 110 according to exemplary embodiments of the present disclosure. As shown in FIG. 1, autonomous ground vehicle 110 can include frame 120, axles 122, wheels 124, one or more imaging sensors 130, each imaging sensor 130 having a corresponding field of view 131. Although autonomous ground vehicle 110 is shown with three imaging sensors 130, autonomous ground vehicle 110 can include any number of imaging sensors 130. Imaging sensors 130 can be positioned to facilitate capturing images of the environment surrounding the perimeter of autonomous ground vehicle 110 to provide a 360° panoramic view of the environment in which autonomous ground vehicle 110 is operating. Although autonomous ground vehicle 110 is shown having three imaging sensors 130, autonomous ground vehicle 110 can include any number of imaging sensors 130 (e.g., two, three, four, five, six, seven, eight, nine, ten, or more). As shown, imaging sensors 130 can be positioned at substantially 120° angles relative to each other, with each imaging sensor 130 providing substantially equal field of view angles. Alternatively, each imaging sensor 130 can employ different lenses to provide wider, or narrower, field of views (e.g., 45°, 60°, 90°, 100°, 180°, etc.). According to certain aspects, one or more of imaging sensor 130 can be adjustable (e.g., orientation, field of view, etc.) to alter the field of view captured by each imaging sensor 130.

Additionally, each imaging sensor 130 can include one or more imaging devices and the imaging sensors 130 can be configured for ranging operations, e.g., where two or more of the imaging devices 130 are operated as parts of stereo pairs, or where one or more of the imaging devices 130 are configured to determine depth information and ranges based on monocular cues detected within imaging data captured thereby.

In addition to imaging sensors 130, autonomous ground vehicle 110 can also include other sensors. For example, autonomous ground vehicle 110 can include an inclinometer, an accelerometer, a gyroscope, speed sensors, laser sensors (e.g., LIDAR), thermal sensors, radar, accelerometers, gyroscopes, compasses, etc. These additional sensors can collect non-image information in connection with the environment and the operation of autonomous ground vehicle 110, such as, for example, velocity, roll, pitch, yaw, direction, time traveled, distance, odometry information (e.g., estimate of relative position based on movement over time), etc. autonomous ground vehicle 110 can also include various transceivers 132 that facilitate communication with other systems. For example, transceivers 132 can include any transmitters and receivers configured to transmit and receive any wireless signals, such as GPS signals, Wi-Fi signals, radio frequency (RF) signals, Bluetooth signals, near-field communication (NFC) signals, etc.

As is shown in FIG. 1, autonomous ground vehicle 110 may include power module 140 (e.g., a battery) and motor 142 (e.g., a DC electric motor operating at twelve to forty-eight volts). Motor 142 may be configured to operate at any speed or have any power rating, and to cause autonomous ground vehicle 110 to travel in a forward direction of travel, a reverse direction of travel or in any other direction of travel as determined by steering component 144. Additionally, axles 122 and wheels 124 of autonomous ground vehicle 110 may also have any dimensions. For example, wheels 124 may have bores or axle pads for accommodating axles 122 of any diameter or thickness, and any number of spokes or other extensions for supporting a rim having any desired spacings or offsets for accommodating tires or other coverings. Each of axles 122 may be joined to and configured to rotate any number of wheels 124, which may include tires or other coverings of any suitable material, including but not limited to rubbers and/or plastics. As described herein, autonomous ground vehicle 110 may employ the use of an annotated reference map and continuously captured images to determine its position and orientation during operation.

Figure 2A:
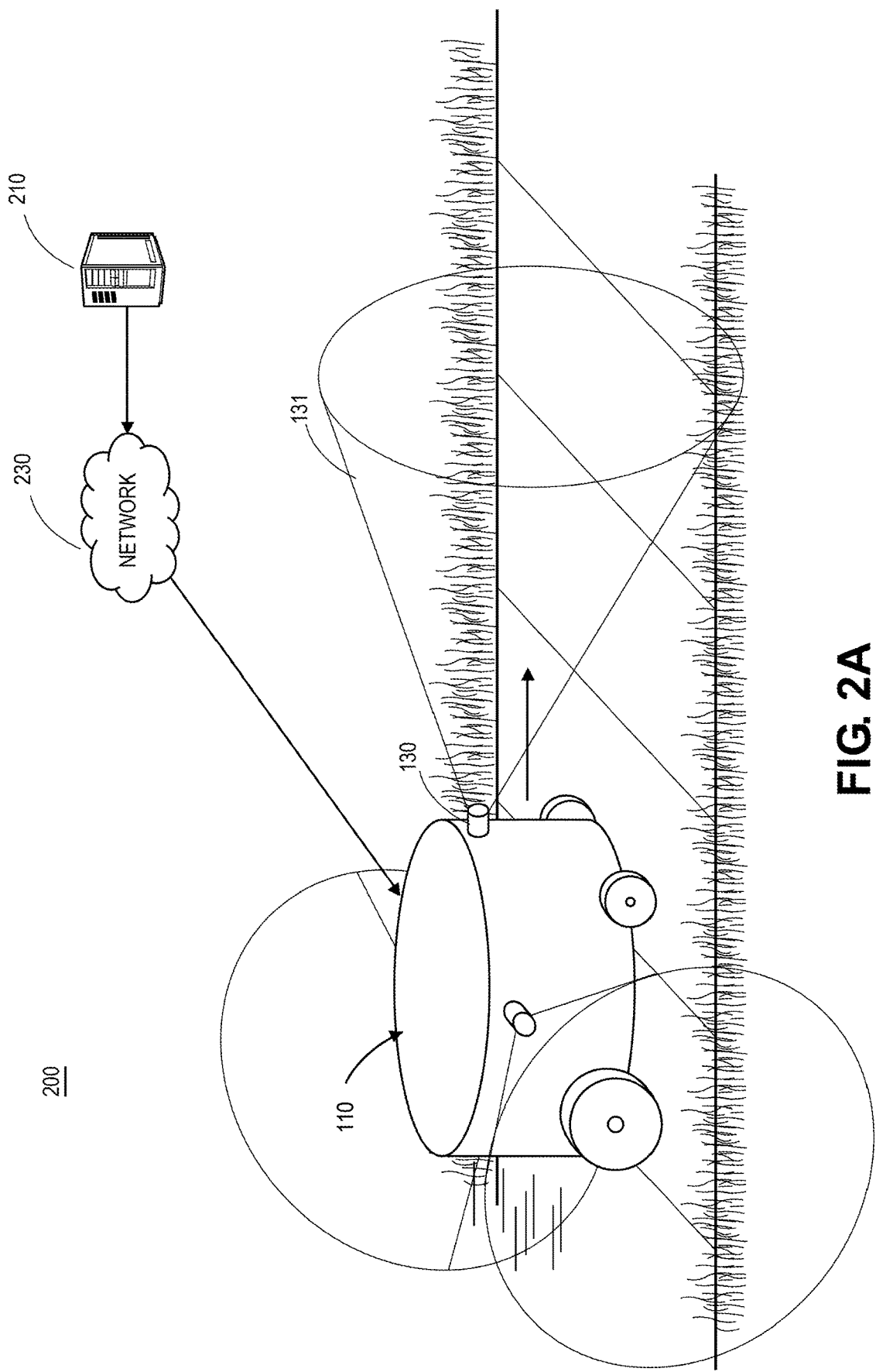
FIGS. 2A and 2B are illustrations of an exemplary environment in which an autonomous ground vehicle may operate, in accordance with embodiments of the present disclosure.
Figure 2B:
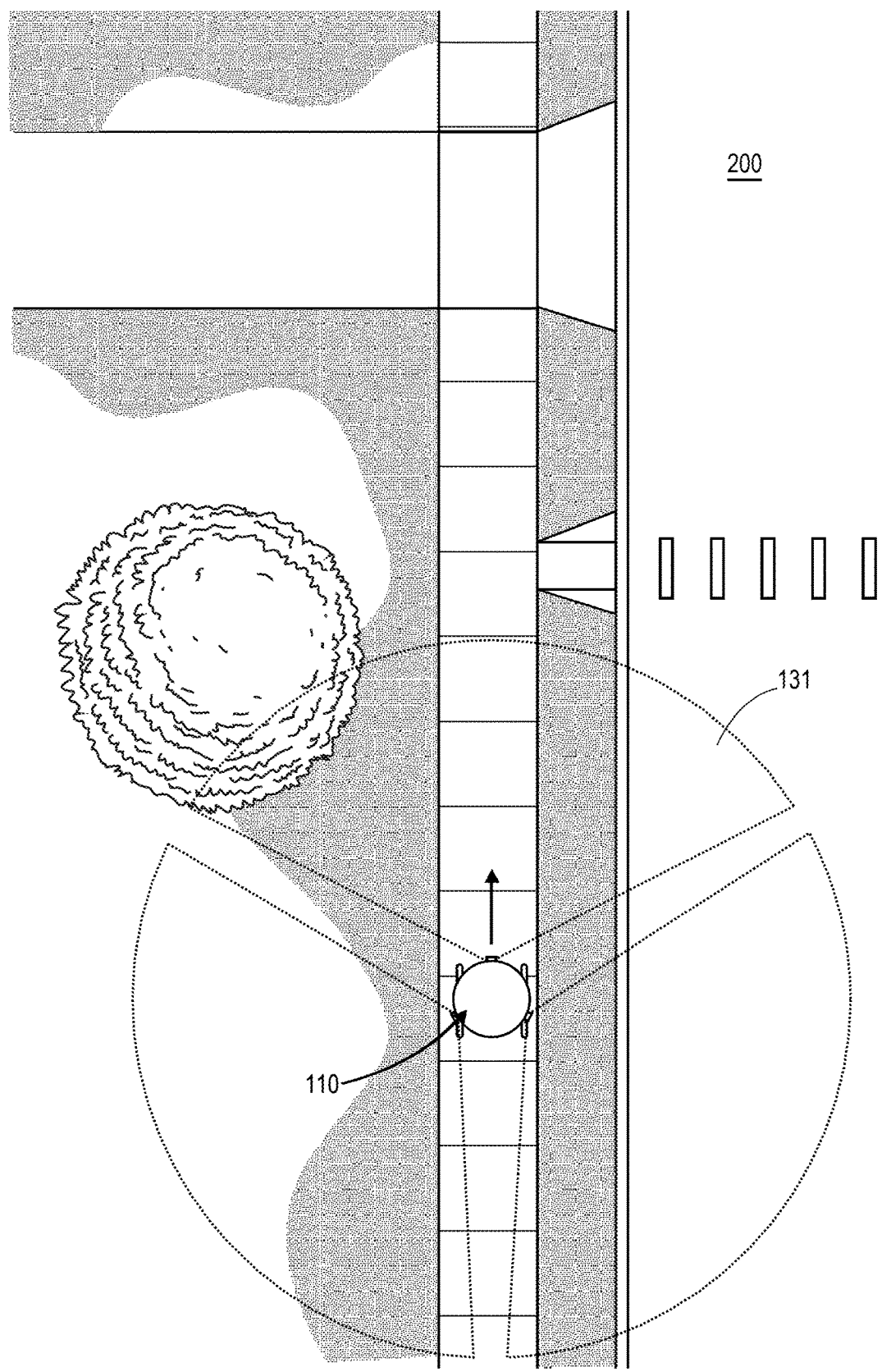

FIGS. 2A and 2B are illustrations of exemplary autonomous ground vehicle 110 operating in environment 200 in accordance with embodiments of the present disclosure. As described herein, environment 200 can include an unstructured environment, which can be used to describe operational environments for vehicles such as sidewalks that are absent defined indicia, such as lane markings, road markings (e.g., stop lines, crosswalks, etc.), etc. As shown in FIGS. 2A and 2B, autonomous ground vehicle 110 can operate on a sidewalk in environment 200 and can access and communicate with server 210 (or other computer system) via network 230. For example, network 230 can include any wired or wireless network (e.g., cellular, satellite, Bluetooth, Wi-Fi, etc.) that can facilitate communications between autonomous ground vehicle 110 and server 210. Server 210 can transmit data and other information, including one or more instructions and/or commands to autonomous ground vehicle 110 to allow autonomous ground vehicle 110 to operate in environment 200. For example, server 210 can provide autonomous ground vehicle 110 with an annotated reference map, delivery instructions, an origin location, a destination location, a package pickup location, any waypoints or stopovers, a planned route, an objective function, etc.

According to embodiments of the present disclosure and as further described herein, an annotated reference map may be or may have been created for environment 200 to facilitate autonomous ground vehicle 110's operation in environment 200. The annotated reference map can be provided to autonomous ground vehicle 110 prior to or during its operation in environment 200 from, for example, server 210 via network 230. Autonomous ground vehicle can then utilize imaging sensors 130 to capture images of environment 200. As further described herein, the images captured by imaging sensors 130 can be used to construct annotated images of environment 200 while autonomous ground vehicle 110 is operating in environment 200. The annotated images can then be used to allow autonomous ground vehicle 110 to determine its position and orientation based on an alignment of the annotated images with the annotated reference map.

Figure 3:
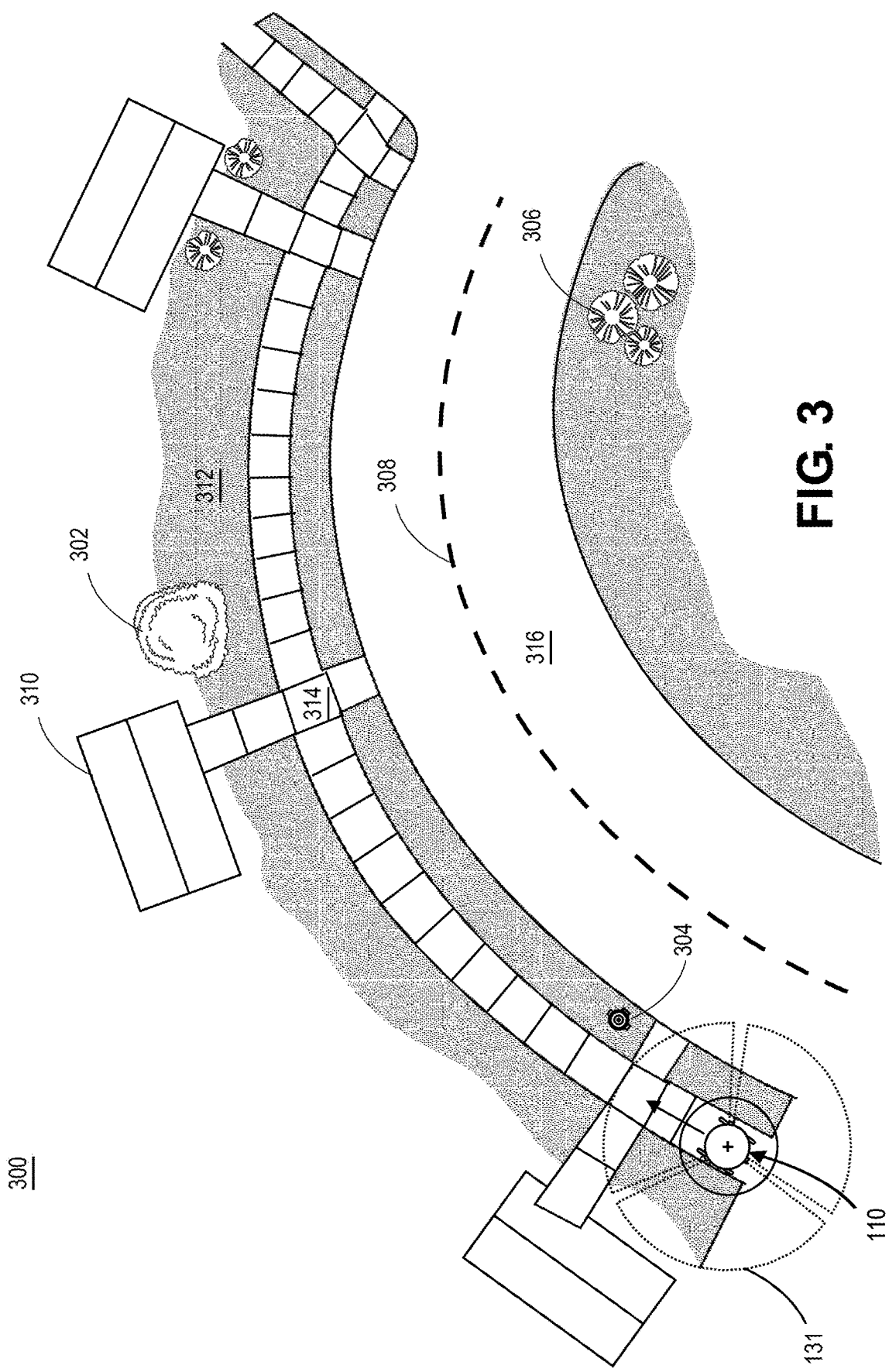
FIG. 3 is an illustration of an exemplary environment in which an autonomous ground vehicle may operate, in accordance with embodiments of the present disclosure.

FIG. 3 shows autonomous ground vehicle 110 operating in environment 300. As shown in FIG. 3, environment 300 can include tree 302, fire hydrant 304, bushes 306, roadway lane marking 308, structures 310 (e.g., houses, etc.), lawns 312, sidewalks 314, and roadway 316. According to other aspects of the present disclosure, environment 300 can include various other features and structures not shown. As autonomous ground vehicle 110 operates in environment 300, autonomous ground vehicle 110 may employ imaging sensors to capture images of environment 300 to determine the position and/or orientation of autonomous ground vehicle 110 as it is operating in environment 300. For example, the images captured by the imaging sensors can be used to create annotated images of environment 300, which can be aligned with an annotated reference map of environment 300 to determine autonomous ground vehicle 110's position and/or orientation. The annotated reference map may have been created in advance to facilitate autonomous ground vehicle 110's operation in environment 300 and may continuously be updated to compensate for changes to environment 300. For example, the annotated reference map may be updated at periodic intervals (e.g., every week, every month, every three months, etc.). Alternatively and/or in addition, the annotated reference map may be updated each time a change in environment is detected. This may include, for example, alerts, warnings, or other known reports/notices that environment 300 is undergoing certain construction (e.g., changes to the roadways, sidewalks, new buildings being erected, building being demolished, etc.), certain environmental changes detected through operation of vehicles (e.g., aerial, ground vehicles, etc.), changes in surveys performed in the environment etc. The annotated reference map can also be updated based on information collected by the operation of an autonomous ground vehicle, such as autonomous ground vehicle 110. For example, as an autonomous ground vehicle is operating in a particular environment, changes in the environment and new environmental features that are detected by the autonomous ground vehicle can be used as feedback information to update the annotated reference map.

According to yet another aspect of the present disclosure, the annotated reference map can be preprocessed to identify certain supplemental information regarding the environment depicted in the annotated reference map and stored as supplemental information along with the binary representation of the annotated reference map. For example, areas of interest in the annotated reference map can be identified and stored as supplemental information associated with the annotated reference map. The identification of areas of interest in the annotated reference map can be based on the nature and number of detected environmental features. Based on the number and nature of the detected environmental features, it can be determined that certain areas of the annotated reference map may be difficult to align with an annotated image in at least one direction, thus, making it difficult to determine the position and/or orientation of autonomous ground vehicle 110 in such areas. For example, an area of the annotated map including a long run of a sidewalk, which can be represented as two parallel lines, with no other detected features may make alignment of the annotated reference map with an annotated image difficult. Specifically, although the alignment of the annotation of the sidewalk in both the reference map and the image may not be difficult, it may be difficult to align the images in a lengthwise direction of the sidewalk (e.g., if the sidewalk extends for 100 m, where along the 100 m the image should be positioned). Such areas of interest can be identified in the annotated reference map and stored as supplemental information. Additionally, identification of areas of interest can be provided via a feedback from autonomous ground vehicle 110. For example, in the event autonomous ground vehicle 110 encounters areas where alignment of annotated images with the annotated reference map is difficult, these areas can be identified and provided via a feedback loop and be stored as supplemental information associated with the annotated reference map.

Figure 4A:
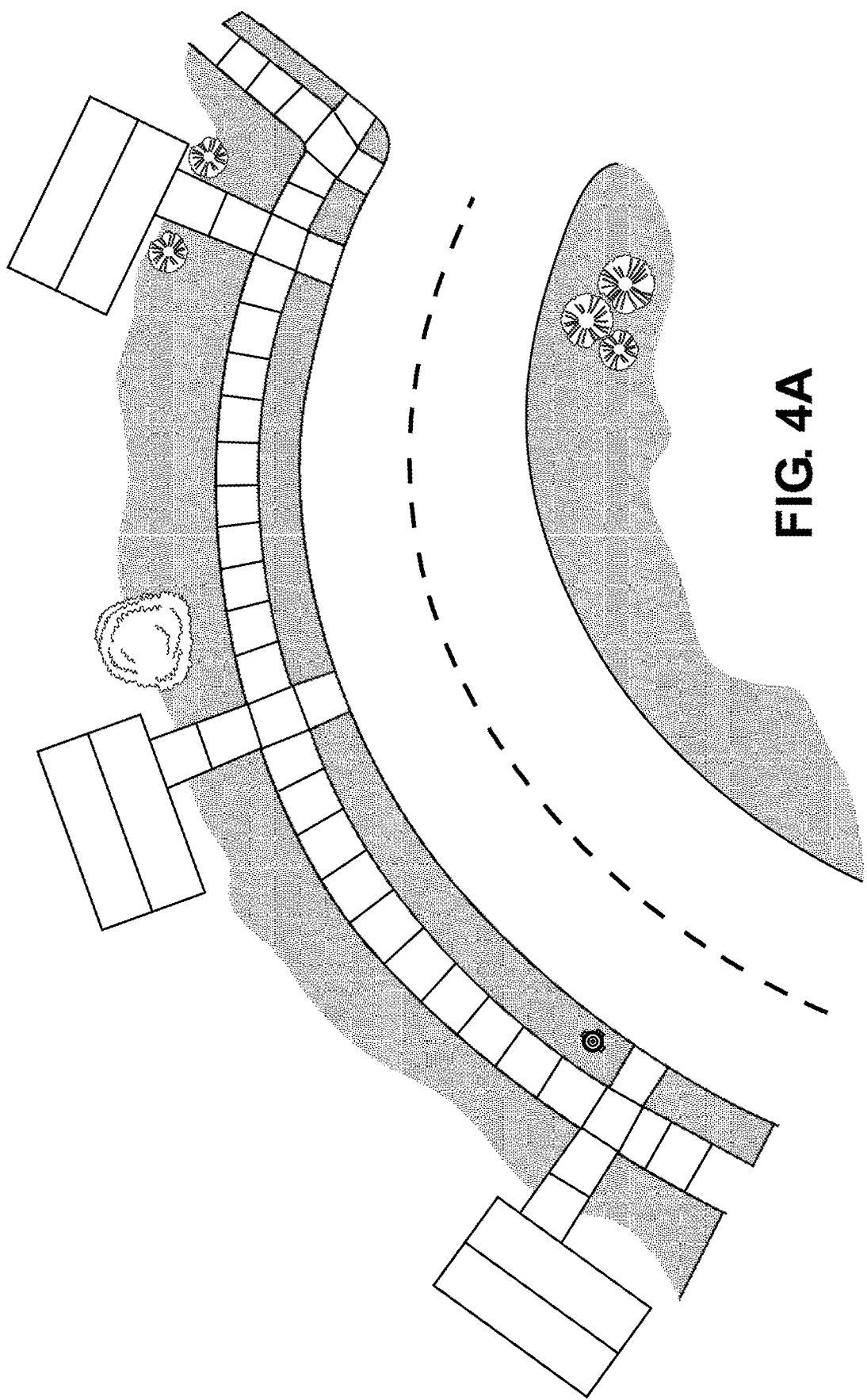
FIG. 4A is an illustration of an image of an environment used to create a reference map, in accordance with embodiments of the present disclosure.
Figure 4B:
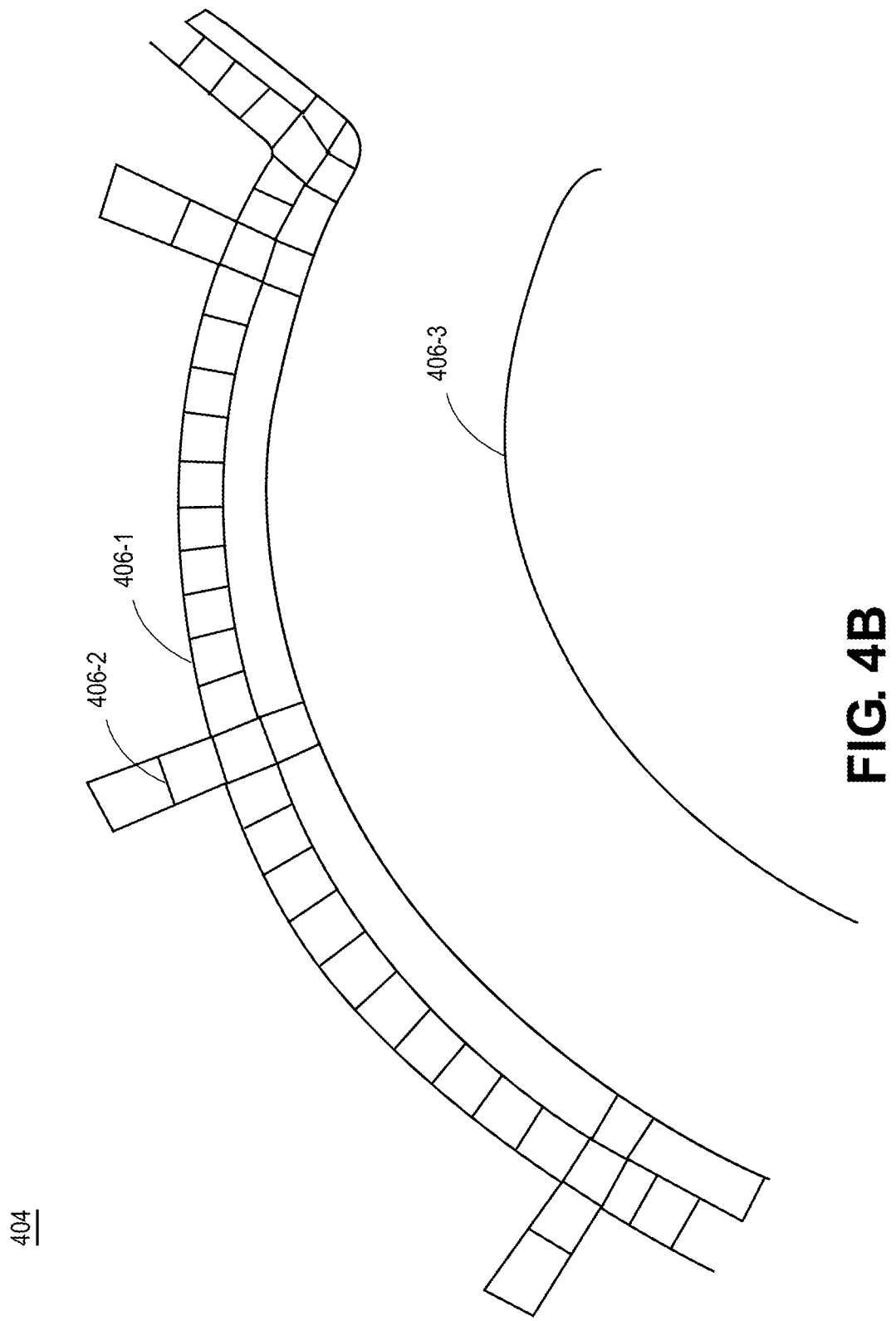
FIG. 4B is an illustration of an annotated binary reference map, in accordance with embodiments of the present disclosure.

FIGS. 4A and 4B are illustrations of creating an annotated reference map of environment 300 in accordance with embodiments of the present disclosure. For example, first one or more images 402 of environment 300 can first be obtained. For example, one or more images 402 of environment 300 in which autonomous ground vehicle 110 is operating can be obtained by aircraft (e.g., unmanned aerial vehicle, etc.), ground vehicles, etc. As shown in FIG. 4A, image 402 can include a depiction of the trees, structures, sidewalks, roads, etc. (e.g., tree 302, fire hydrant 304, bushes 306, roadway lane marking 308, structures 310, lawns 312, sidewalks 314, and roadway 316 of environment 300) contained in environment 300. According to one aspect of the present disclosure, these images are preferably high definition images, and, as shown in FIG. 4A, can include an overhead bird's-eye view image 402 of environment 300. The captured images can be utilized to construct a two-dimensional representation of the environment, and certain environmental features can be detected in image 402. For example, the environmental features can be detected from a bird's-eye overhead perspective, or the environmental features can be detected by virtually inserting a camera into the representation of the environment and simulating the operation of an autonomous ground vehicle through the representation of the environment. Accordingly, the environmental features can be detected during the simulated operation of the autonomous ground vehicle in the representation of the environment.

The detected environmental features can include environmental features that are not indicia of and/or do not define a structured environment, such as roadway markings, lane markings, stop lines, crosswalks, arrows, words, etc. For example, the detected environmental features can include cracks in a sidewalk, the edges of the sidewalk, a curb, the edge/boundary of a lawn or grassy area, the edge/boundary of a dirt, gravel, or unpaved area, the edge of a driveway, etc. In environment 300, the detected environmental features can include cracks/separations in sidewalks 314, the edges and/or boundaries lawns 312, sidewalks 314, and roadway 316, etc. According to certain aspects of the present disclosure, the environmental features can be detected manually, using line segment detectors (e.g., Canny, Line Segment Detector, etc.), a segmented semantic map, a trained network (e.g., a trained classifier, a machine learning system, a deep learning system, etc.), etc., or any combination thereof.

After detection of the environmental features, image 402 can be annotated with line segments to represent the detected environmental features. The annotated image, which includes annotated line segments 406-1 through 406-N representing the detected environmental features, can serve as the annotated reference map. According to certain aspects of the present disclosure, the reference map can be represented as binary map 404, as shown in FIG. 4B. As illustrated in FIG. 4B, the annotated reference map is shown as binary map 404 where line segments 406-1 through 406-N, which correspond to the detected environmental features, can include non-zero values, and the remaining space can be represented as zero values. As can be seen in FIG. 4B, the detected environmental features represented by line segments 406-1 through 406-N can include, for example, the sidewalk, the edges of the sidewalk/edges of lawns, cracks and/or separations in the sidewalk, the edge of roadways, driveways, etc. Line segment 406-1 can represent the edge of the sidewalk/boundary of a lawn, line segment 406-2 can represent a crack or separation in the sidewalk, line segment 406-3 can represent the edge of the roadway, etc. As shown in FIG. 4B, features in environment 300, such as tree 302, fire hydrant 304, bushes 306, roadway lane marking 308, structures 310 (e.g., houses), and lawns 312, not detected and annotated with corresponding line segments are shown as blank space in binary reference map 404. Binary map 404 can be used as the annotated reference map by autonomous ground vehicle 110 during operation of autonomous ground vehicle 110 to determine its position and/or orientation.

Figure 5A:
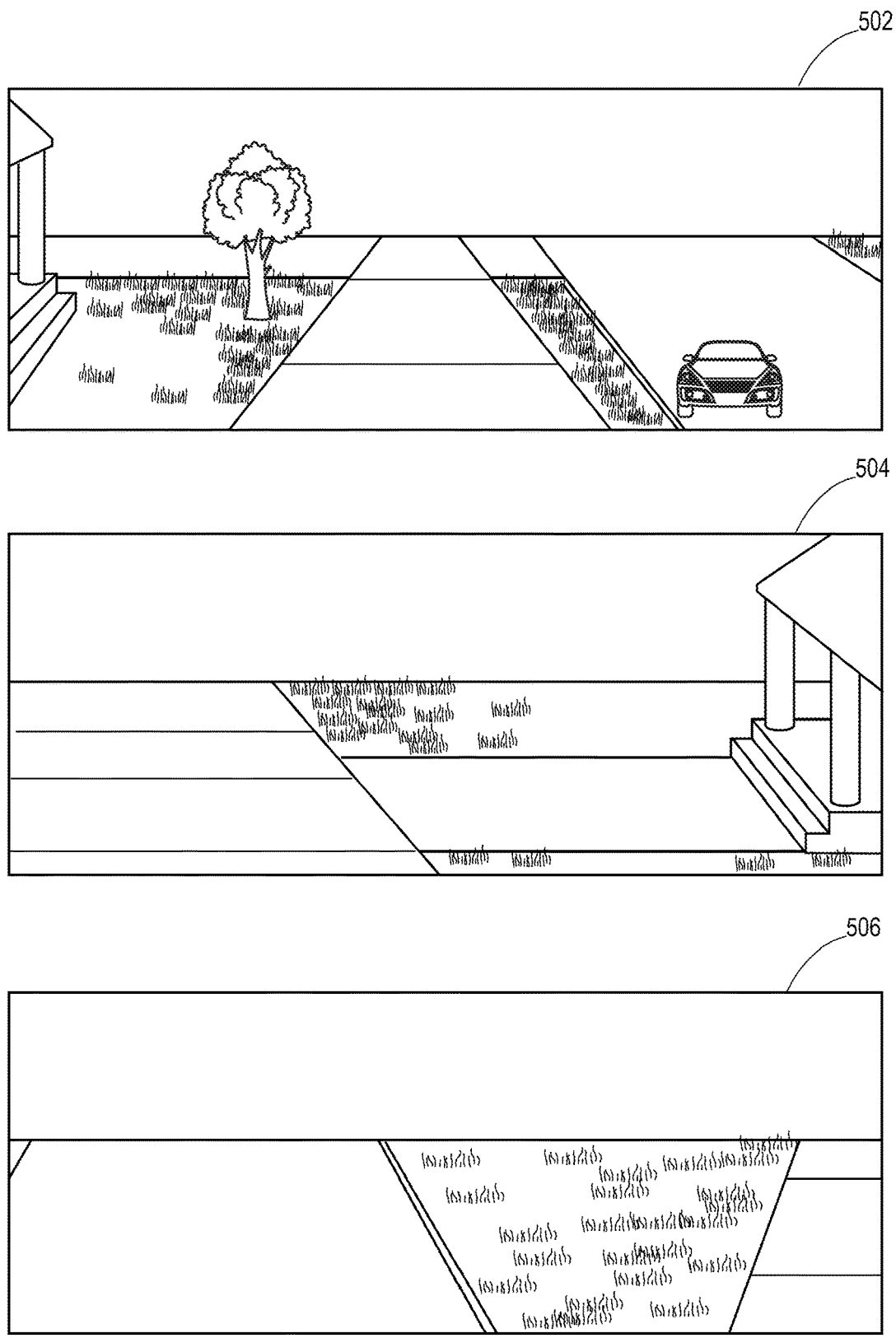
FIG. 5A is an illustration of images of an environment used to create an annotated image, in accordance with embodiments of the present disclosure.

As described herein, autonomous ground vehicles typically employ a multitude of various sensors to facilitate autonomous operation. FIG. 5A show exemplary images 502, 504, and 506 that imaging sensors 130 may capture at a given time and/or location of autonomous ground vehicle 110 during operation of autonomous ground vehicle 110. For example, imaging sensors 130 can obtain one or more images 502, 504, and 506, as autonomous ground vehicle 110 is moving, to provide a 360° panoramic view around autonomous ground vehicle 110 of the environment. The images captured at a given location (e.g., images 502, 504, and 506) can be considered a set of images that represent a 360° panoramic view of the environment around the perimeter of autonomous ground vehicle 110 at that given location. As shown in FIG. 5A, image 502 can be captured by a forward-facing imaging sensor 130, images 504 and 506 can be captured by imaging sensors 130 positioned to capture the sides and rear of the perimeter of autonomous ground vehicle 110. Alternatively, autonomous ground vehicle 110 can utilize more than three imaging sensors 110 to capture a 360° panoramic view of the environment around the perimeter of autonomous ground vehicle 110.

Figure 5B:
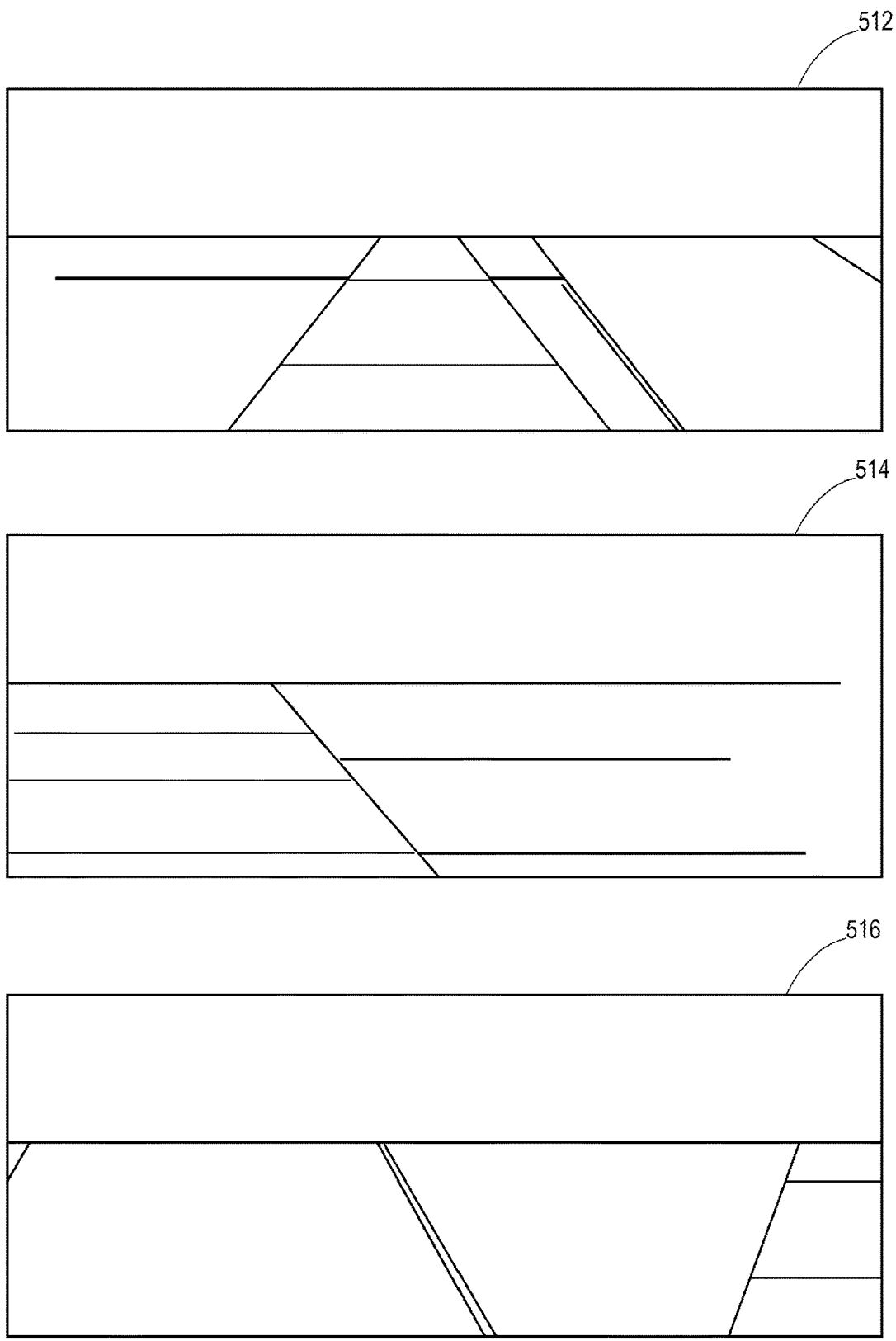
FIG. 5B is an illustration of annotated binary images, in accordance with embodiments of the present disclosure.

Similar to the detection of environmental features and the annotation of the reference map, certain environmental features can be detected in images 502, 504, and 506 as autonomous ground vehicle 110 is operating in the environment. The detected environmental features can include environmental features that are not indicia of and/or do not define a structured environment, such as, for example, lane markings, stop lines, crosswalks, arrows, words, etc. For example, the detected environmental features can include cracks in a sidewalk, the edges of the sidewalk, a curb, the edge/boundary of a lawn or grassy area, the edge/boundary of a dirt, gravel, or unpaved area, the edge of a driveway, etc. and can be annotated with line segments. The detected and annotated environmental features can include cracks/separations in sidewalks, the edges and/or boundaries lawns, sidewalks, and roadway, etc. FIG. 5B shows images 512, 514, and 516, which are illustrations of images 502, 504, and 506, respectively, where the environmental features have been detected and annotated with line segments. According to certain aspects of the present disclosure, the environmental features can be detected manually, using line segment detectors (e.g., Canny, Line Segment Detector, etc.), a semantic segmentation process, a trained network (e.g., a trained classifier, a machine learning system, a deep learning system, etc.), etc., or any combination thereof. For example, in employing a semantic segmentation process, a semantic segmentation algorithm can be applied to first segment the image into various regions such as sidewalk, driveway, road, grass etc. Next, a binary image can be generated where the edges/boundaries between different segments are marked as non-zero (e.g., edges of the sidewalk, etc.).

After detection of the environmental features, images 512, 514, and 516 can be annotated with line segments to represent the detected environmental features. Annotated images can be created by autonomous ground vehicle 110 continuously during operation, periodically during operation, or on-demand when autonomous ground vehicle 110's position and/or orientation is to be determined.

Figure 5C:
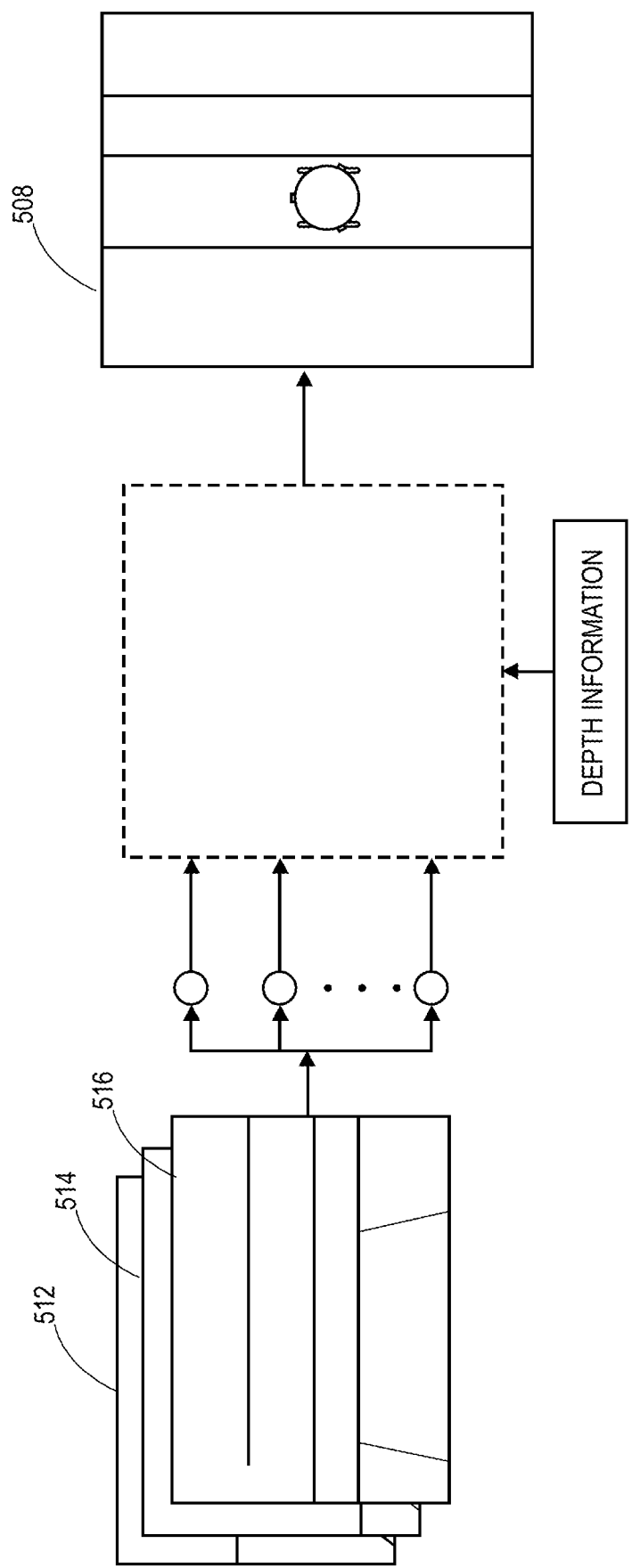
FIG. 5C is a block diagram illustration of combining and transforming images, in accordance with embodiments of the present disclosure.

As shown in FIG. 5C, depth information associated with one or more of images 502, 504, and 506 can be determined and used to transform the perspective view images 512, 514, and 516 to bird's-eye view image 508 of the environment. According to certain aspects, multiple sets of images of the environment, captured at different times and positions as autonomous ground vehicle 110 is navigating along its route, may be combined together to construct a single bird's-eye view image 508 of the environment. For example, autonomous ground vehicle 110 can combine one or more images captured by autonomous ground vehicle 110 as autonomous ground vehicle 110 travels a certain distance. For example, all images and image sets captured as autonomous ground vehicle 110 travels a distance of 1 m, 2 m, 3 m, 4 m, 5 m, 10 m, or any other distance, can be combined and transformed to yield one or more bird's-eye view image(s). The annotated bird's-eye view image(s), which includes the line segments representing the detected environmental features, can serve as the annotated image constructed by autonomous ground vehicle 110 at a given location. Alternatively, the environmental features can be detected and annotated in image 508 (rather than in images 512, 514, and 516).

Figure 5D:
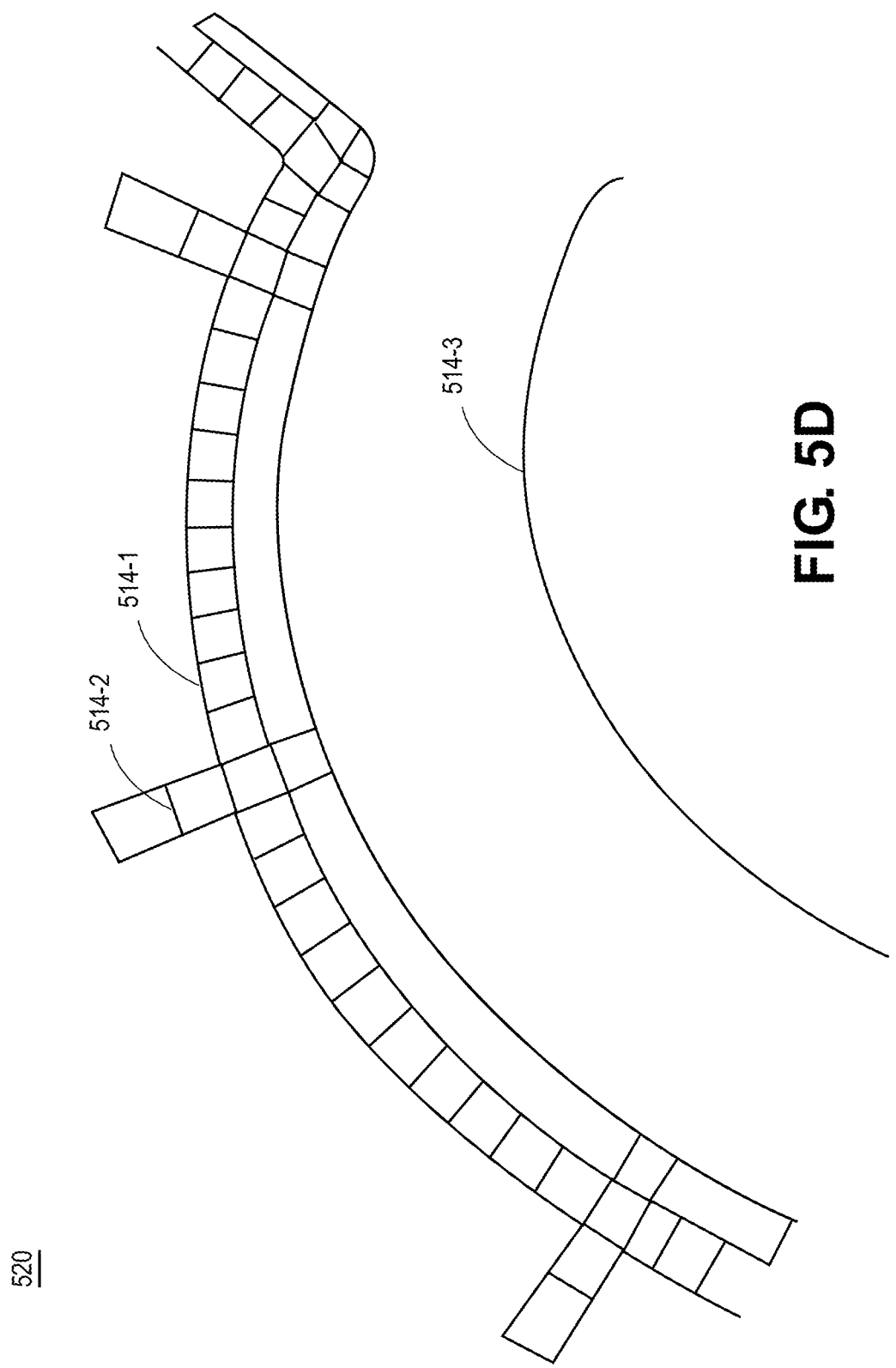
FIG. 5D is an illustration of an annotated binary image, in accordance with embodiments of the present disclosure.

According to certain aspects of the present disclosure, the annotated image can be represented as binary image 520, as shown in FIG. 5D. As illustrated in FIG. 5D, the annotated image is shown as binary image 520, where line segments 514-1 through 514-N, which correspond to the detected environmental features, can include non-zero values, and the remaining space can be represented as zero values. As can be seen in FIG. 5D, the detected environmental features represented by line segments 514-1 through 514-N can include, for example, the sidewalk, the edges of the sidewalk/edges of lawns, cracks and/or separations in the sidewalk, the edge of roadways, driveways, etc. Line segment 514-1 can represent the edge of the sidewalk/boundary of a lawn, line segment 514-2 can represent a crack or separation in the sidewalk, line segment 514-3 can represent the edge of the roadway, etc. As shown in FIG. 5D, features in environment 300, such as tree 302, fire hydrant 304, bushes 306, roadway lane marking 308, structures 310 (e.g., houses), and lawns 312, not detected and annotated with corresponding line segments, are shown as blank space in binary image 520.

According to certain aspects of the present disclosure, autonomous ground vehicle 110 can continuously capture images using imaging sensors 130 as autonomous ground vehicle 110 operates in an environment. Accordingly, the captured, detected, and annotated images can be continuously and/or periodically combined and transformed to obtain bird's-eye view images as autonomous ground vehicle 110 operates in an environment, or the transformed image can be created each time the position and/or orientation of autonomous ground vehicle 110 is desired.

Figure 6B:
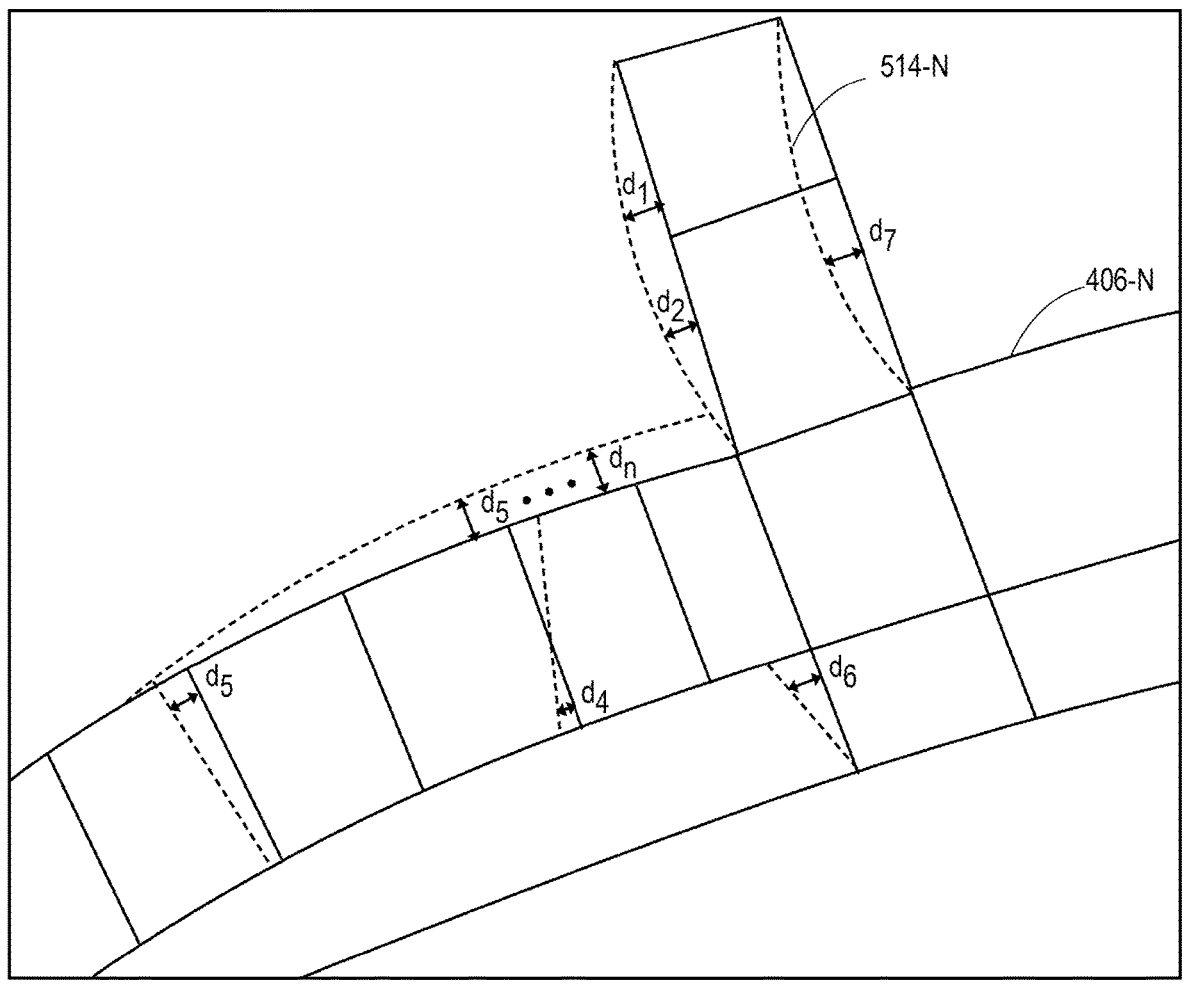

FIGS. 6A and 6B illustrate binary image 520 overlaid on top of binary map 404 to illustrate alignment of binary image 520 and binary map 404 to determine a position and/or orientation of autonomous ground vehicle 110 according to embodiments of the present disclosure. As shown in FIGS. 6A and 6B, the dashed lines can represent line segments 514-1 through 514-N from binary image 520 and the solid lines can represent line segments 406-1 through 406-N from binary map 404. As described herein, binary image 520 can be aligned with binary map 404, and the relative translation and rotation applied to obtain alignment of binary image 520 and binary map 404 can be utilized to obtain the position and orientation of the autonomous ground vehicle. Achieving perfect alignment of binary image 520 to binary map 404 is unlikely. For example, each of binary image 520 and binary map 404 may include detection errors and errant line segments. Accordingly, an alignment score can be determined for each relative position of binary image 520 to binary map 404, and if the alignment score is within an acceptable tolerance range, it can be determined that alignment of binary image 520 and binary map 404 has been achieved. According to certain exemplary embodiments of the present disclosure, the alignment score can be based on the Euclidean distances from each non-zero pixel in binary image 520 to the closest corresponding non-zero pixel in binary map 404. The Euclidean distances can be obtained, for example, by performing a distance transform to obtain a distance map, which can include a matrix of all Euclidean distances from each non-zero pixel in binary image 520 to the closest corresponding non-zero pixel in binary map 404. Once the distance map has been determined, the alignment score for each relative positioning of binary image 520 to binary map 404 can be determined. For example, the alignment score can include an aggregate sum of all the distances for each non-zero pixel of binary image 520 to the closest corresponding non-zero pixel of binary map 404 (e.g., a sum of all the distances included in the distance map), a number of non-zero pixels in binary image 520 that are disposed at a distance within a threshold distance from the closest corresponding non-zero pixel of binary map 404, a ratio of the number of non-zero pixels in binary image 520 that are disposed at a distance within a threshold distance from the closest corresponding non-zero pixel of binary map 404 to the number of non-zero pixels in binary image 520 that are positioned at a distance that exceeds the threshold distance from the closest corresponding non-zero pixel of binary map 404, etc., or any combination thereof.

According to certain exemplary embodiments of the present disclosure, an initial relative position of binary image 520 to binary map 404 can be based on odometry information from autonomous ground vehicle 110. For example, autonomous ground vehicle 110 can estimate its anticipated position and orientation based on planned route, distance travelled, time travelled, speed travelled, etc. Accordingly, this information can be utilized to determine the initial relative positioning of binary image 520 to binary map 404. Next, the alignment score can be determined for the initial relative positioning. If the alignment score is within the determined acceptable tolerance range, it can be determined that alignment has been achieved and the relative translation and rotation utilized to achieve alignment of binary image 520 and binary map 404 can be determined to provide an estimate of autonomous ground vehicle 110's position and/or orientation. In the event that the alignment score is not within an acceptable tolerance range, binary image 520 can be repositioned relative to binary map 404, and the alignment score for the new relative positioning can be determined. Once again, the newly determined alignment score can be compared against the acceptable tolerance range. The repositioning of binary image 520 relative to binary map 404 and the determination of the alignment score can be iteratively repeated until alignment is achieved through a determination that the associated alignment score of the relative positioning of binary image 520 and binary map 404 is within an acceptable tolerance range. According to certain aspects, a multitude of different relative positionings of binary image 520 and binary map 404 can be precomputed and stored in an array, and the alignment score for each relative positioning can be calculated and the relative positioning with the optimal alignment score can be returned as the positioning corresponding to alignment of binary image 520 and binary map 404.

FIG. 6B shows a closeup illustration of a portion of the overlay of binary image 520 on top of binary map 404 shown in FIG. 6A. FIG. 6B shows the distances $d_1$ through $d_n$ that are determined based on the relative positioning of binary image 520 to binary map 404. For example, each of distance $d_1$ through $d_n$ can represent the distance from a non-zero pixel of binary image 520 to the closest corresponding non-zero pixel in binary map 404. Although distances $d_1$ through $d_n$ are shown as annotations on an overlay of binary image 520 on binary map 404, according to certain aspects of the present disclosure, each of distances $d_1$ through $d_n$ can be stored in an array, which can include all the distances $d_1$ through $d_n$ for a given relative positioning of binary image 520 to binary map 404.

Once alignment of binary image 520 and binary map 404 has been obtained, the position and/or orientation of autonomous ground vehicle 110 can be determined based on the relative translation and rotation utilized to obtain alignment of binary image 520 and binary map 404. For example, in constructing binary map 404 (e.g., the binary representation of the annotated reference map), the location of the constructed binary map 404 and the resolution of the images used to construct binary image 520 are known. Accordingly, a scale of binary map 404 and binary image 520 can be determined using this known information. The relative translation applied to obtain alignment of binary image 520 and binary map 404 can then be applied to the known location of binary map 404 to obtain the position of autonomous ground vehicle 110. The angle of the relative rotation applied to obtain alignment of binary image 520 and binary map 404 can also be used to determine the orientation of autonomous ground vehicle 110.

Figure 7:
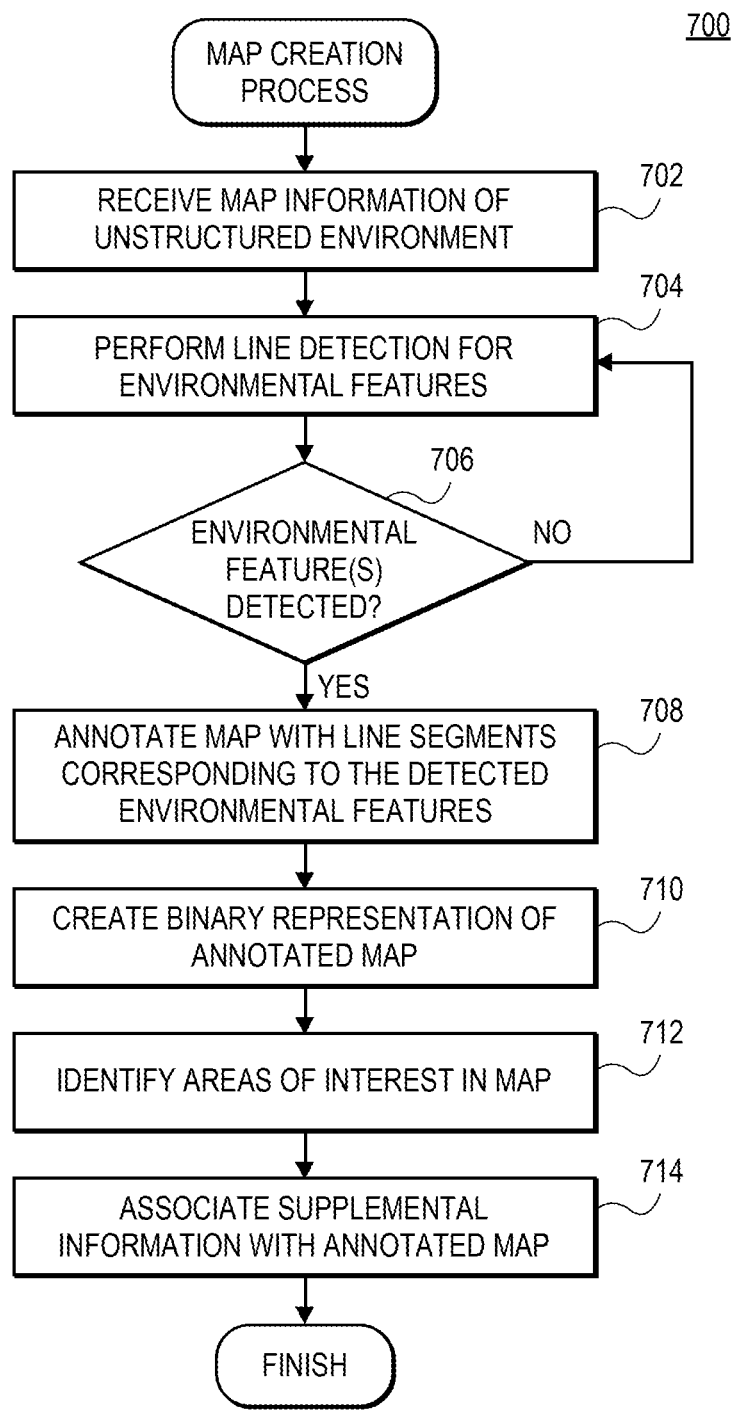
FIG. 7 is a flow diagram of an exemplary map creation process, in accordance with embodiments of the present disclosure.

FIG. 7 shows a flow diagram of an exemplary process 700 for constructing an annotated reference map (e.g., binary map 404) according to embodiments of the present disclosure. Process 700 may be performed before an autonomous ground vehicle is operating in an environment. As shown in FIG. 7, in step 702 map information associated with an unstructured environment in which an autonomous ground vehicle may operate can be received (e.g., environment 300). This can include, for example, an overhead bird's-eye view of the environment or perspective view images from the perspective of an autonomous ground vehicle operating in the environment. Next, certain environmental features can be detected in the image in step 704. For example, the detected environmental features can include environmental features, such as, cracks in a sidewalk, the edges of the sidewalk, a curb, the edge/boundary of a lawn or grassy area, the edge/boundary of a dirt, gravel, or unpaved area, the edge of a driveway, etc. According to certain aspects of the present disclosure, features that are indicia of and/or define a structured environment, such as, for example, lane markings, stop lines, crosswalks, arrows, words, etc. may not be detected. The detection of the environmental features can be performed, for example, manually, using line segment detectors (e.g., Canny, Line Segment Detector, etc.), a segmented semantic map, a trained network (e.g., a trained classifier, a machine learning system, a deep learning system, etc.), etc., or any combination thereof. According to embodiments where the map information received in step 702 include images from the perspective of an autonomous ground vehicle operating in the environment, the images can be utilized to construct a two-dimensional representation of the environment. Subsequently, rather than performing the feature detection from the bird's-eye view perspective, the detection of certain environmental features can be performed by virtually inserting a camera into the representation of the environment and simulating the operation of an autonomous ground vehicle through the representation of the environment. Accordingly, the environmental features can be detected during the simulated operation of the autonomous ground vehicle in the representation of the environment. In step 706, it is determined whether any environmental features have been detected, and in step 708, any detected environmental features are annotated with line segments such that the line segments correspond to the detected environmental features. Subsequently, a binary representation of the annotated image is created in step 710.

Optionally, in steps 712 and 714, areas of interest in the annotated reference map can be identified (e.g., via preprocessing, via feedback from an autonomous ground vehicle, etc.) and stored as supplemental information. This can include, for example, areas of interest identified in the annotated reference map based on the nature and number of detected environmental features that may be difficult to align with an annotated image in at least one direction, thus, making it difficult to determine the position and/or orientation of an autonomous ground vehicle (e.g., autonomous ground vehicle 110) in such areas.

Figure 8A:
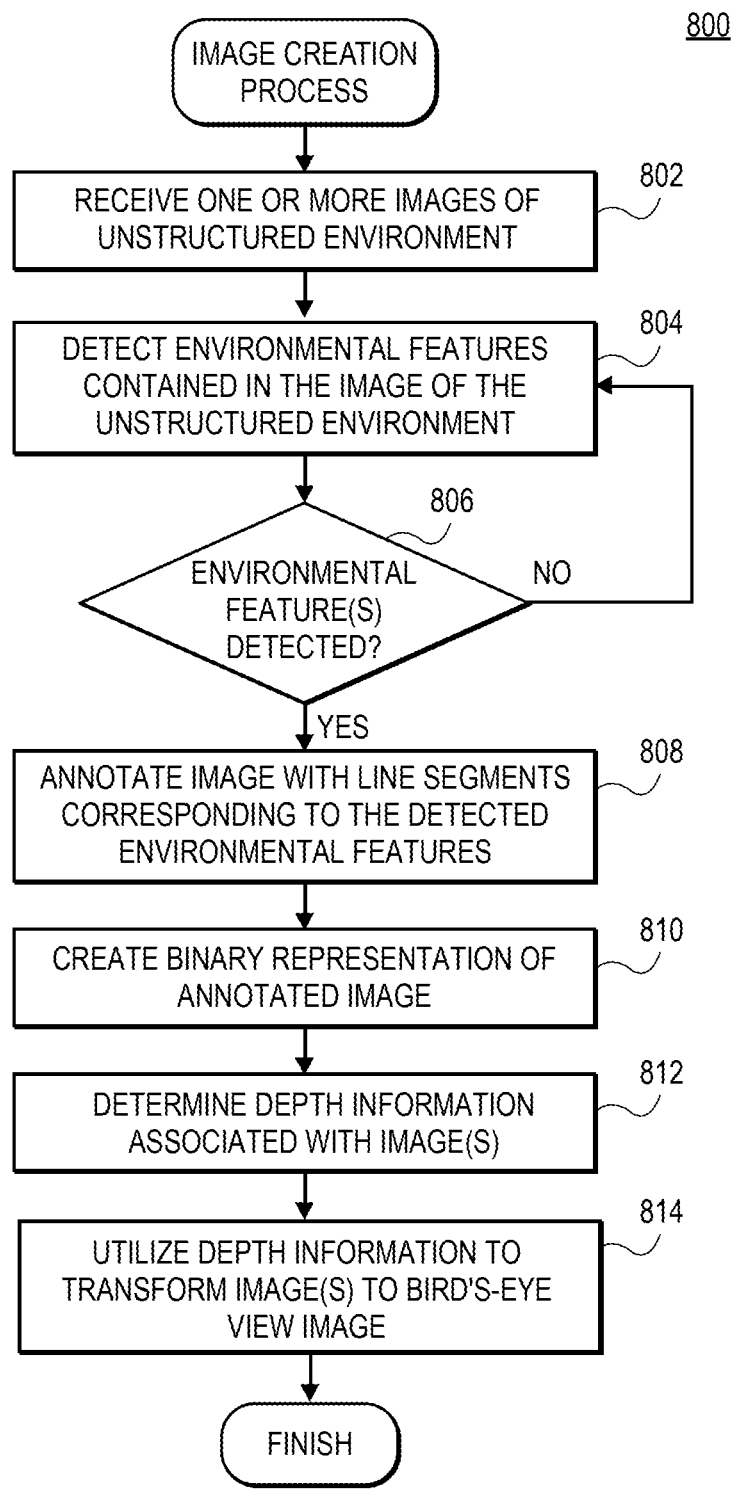
FIG. 8A is a flow diagram of an exemplary image creation process, in accordance with embodiments of the present disclosure.
Figure 8B:
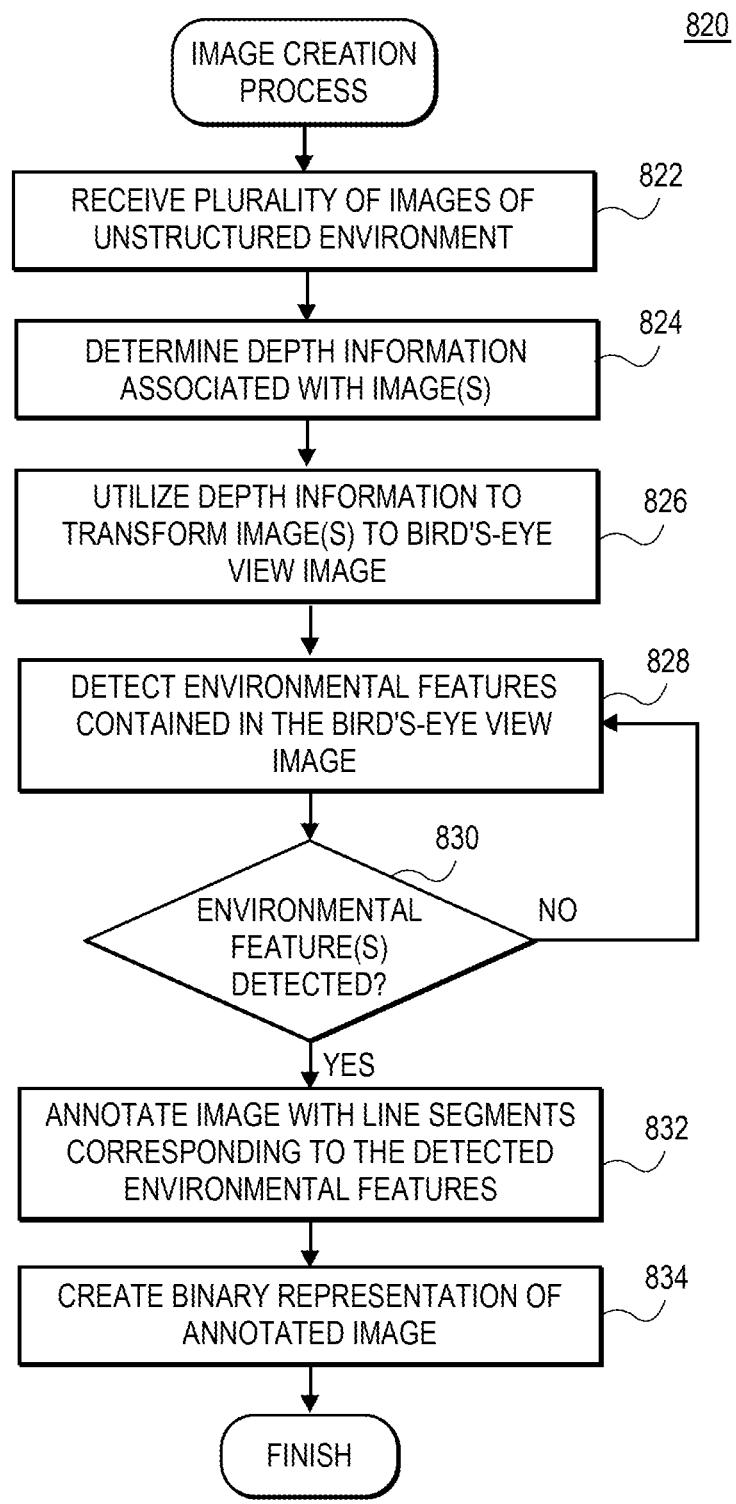
FIG. 8B is a flow diagram of an exemplary image creation process, in accordance with embodiments of the present disclosure.

FIG. 8A shows a flow diagram of an exemplary process 800 for constructing an annotated image (e.g., binary image 520) according to embodiments of the present disclosure. Process 800 may be performed as an autonomous ground vehicle (e.g., autonomous ground vehicle 110) is operating in an environment (e.g., environment 300) and a position and/or orientation of the autonomous ground vehicle is desired. As shown in FIG. 8B, in step 802, a plurality of images of the environment are received. For example, the plurality of images can include a plurality of images captured by imaging sensors 130, which can provide a 360° panoramic view of the environment surrounding the autonomous ground vehicle. Next, certain environmental features can be detected in the image in step 804. For example, the detected environmental features can include environmental features, such as, cracks in a sidewalk, the edges of the sidewalk, a curb, the edge/boundary of a lawn or grassy area, the edge/boundary of a dirt, gravel, or unpaved area, the edge of a driveway, etc. According to certain aspects of the present disclosure, features that are indicia of and/or define a structured environment, such as, for example, lane markings, stop lines, crosswalks, arrows, words, etc. may not be detected. The detection of the environmental features can be performed, for example, manually, using line segment detectors (e.g., Canny, Line Segment Detector, etc.), a segmented semantic map, a trained network (e.g., a trained classifier, a machine learning system, a deep learning system, etc.), etc., or any combination thereof. In step 806, it is determined whether any environmental features have been detected, and in step 808, any detected environmental features are annotated with line segments such that the line segments correspond to the detected environmental features. Subsequently, a binary representation of the annotated image is created in step 810. In step 812, depth information associated with at least one of the plurality of images is determined, and, in step 814, the depth information is utilized to transform the image from a perspective view image to an overhead bird's-eye view image.

FIG. 8B shows a flow diagram of an exemplary process 820 for constructing an annotated image (e.g., binary image 520) according to embodiments of the present disclosure. Process 820 may be performed as an autonomous ground vehicle (e.g., autonomous ground vehicle 110) is operating in an environment (e.g., environment 300) and a position and/or orientation of the autonomous ground vehicle is desired. Process 820 may be similar to process 800, however, in process 820, the environmental features may be detected in the overhead bird's-eye view image, rather than the perspective view image(s). As shown in FIG. 8B, in step 822, a plurality of images of the environment are received. For example, the plurality of images can include a plurality of images captured by imaging sensors 130, which can provide a 360° panoramic view of the environment surrounding the autonomous ground vehicle. Next, depth information associated with at least one of the plurality of images is determined in step 824, and, in step 826, the depth information is utilized to transform the image from a perspective view image to an overhead bird's-eye view image. After the overhead bird's-eye view image has been created, certain environmental features can be detected in the image in step 828. For example, the detected environmental features can include environmental features, such as, cracks in a sidewalk, the edges of the sidewalk, a curb, the edge/boundary of a lawn or grassy area, the edge/boundary of a dirt, gravel, or unpaved area, the edge of a driveway, etc. According to certain aspects of the present disclosure, features that are indicia of and/or define a structured environment, such as, for example, lane markings, stop lines, crosswalks, arrows, words, etc. may not be detected. The detection of the environmental features can be performed, for example, manually, using line segment detectors (e.g., Canny, Line Segment Detector, etc.), a segmented semantic map, a trained network (e.g., a trained classifier, a machine learning system, a deep learning system, etc.), etc., or any combination thereof. In step 830, it is determined whether any environmental features have been detected, and in step 832, any detected environmental features are annotated with line segments such that the line segments correspond to the detected environmental features. Subsequently, a binary representation of the annotated image is created in step 834.

Figure 9:
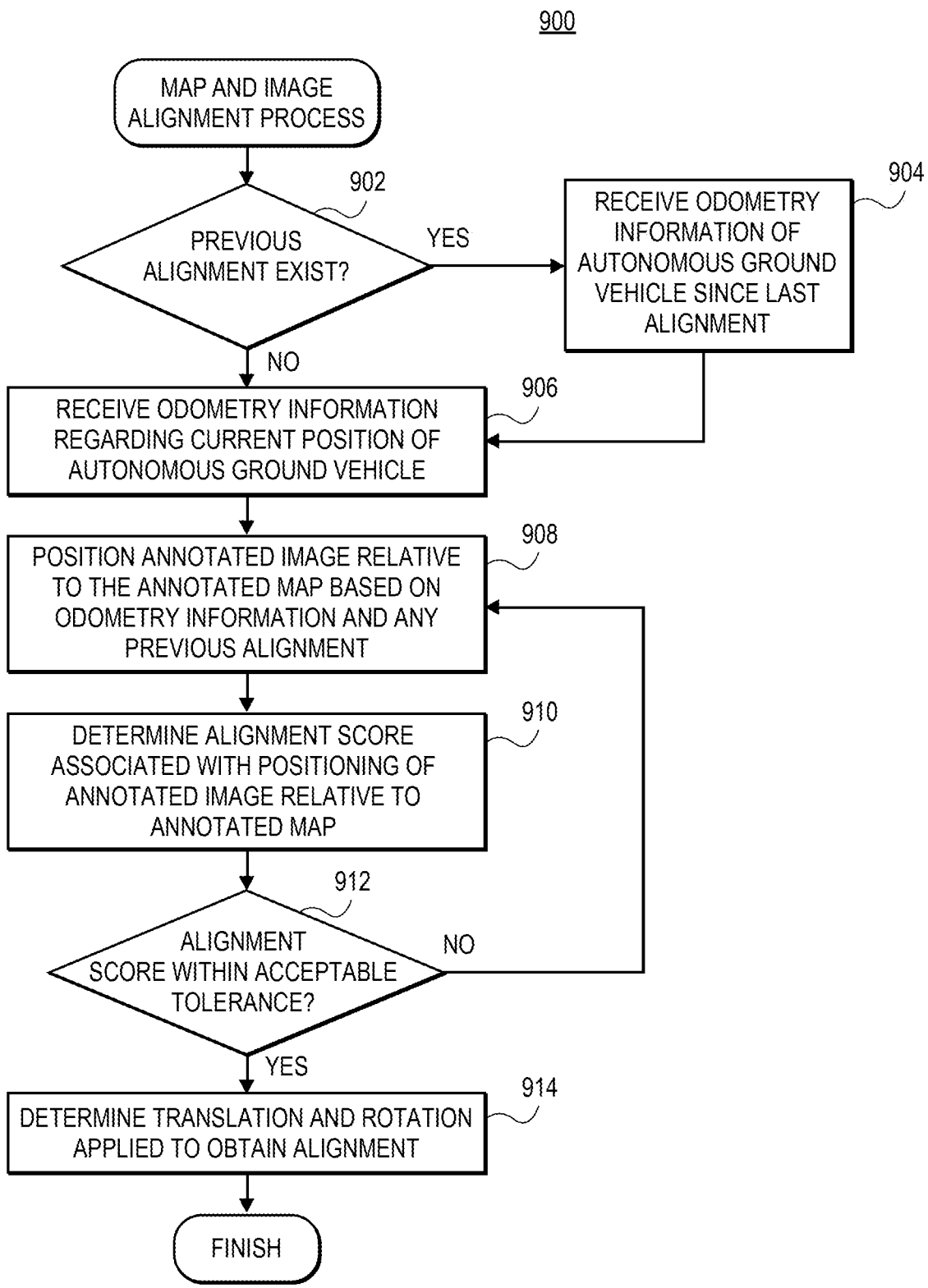
FIG. 9 is a flow diagram of an exemplary alignment process, in accordance with embodiments of the present disclosure.

FIG. 9 shows a flow diagram of an exemplary process 900 for aligning an annotated image (e.g., binary image 520) with an annotated reference map (e.g., binary map 404). In step 902, it is first determined if alignment between an annotated image and the annotated reference map had been previously been obtained at a prior position of the autonomous ground vehicle. In the instance that such an alignment had been obtained, the odometry information regarding operation of the autonomous ground vehicle since the previously identified alignment is received, in step 904. In step 906, odometry information regarding the current position of the autonomous ground vehicle is received. This can include, for example, the autonomous ground vehicle's planned route, distance travelled, time travelled, speed travelled, etc. The odometry information (including any odometry information received in step 904) can be used to position an annotated image (e.g., binary image 520) relative to an annotated reference map (e.g., binary map 404) in step 908. Next, in step 910, an alignment score is determined in connection with the relative positioning of the annotated image and the annotated reference map. In step 912, the alignment score is compared against a construct of an annotated reference map according to embodiments of the present disclosure. The alignment score can include an aggregate sum of all the distances for each pixel of the annotated image to the closest corresponding pixel of the annotated reference map, a number of pixels in the annotated image that are disposed at a distance within a threshold distance from the closest corresponding pixel of the annotated reference map, a ratio of the number of pixels in the annotated image that are disposed at a distance within a threshold distance from the closest corresponding pixel of the annotated reference map to the number of pixels in the annotated image that are positioned at a distance that exceeds the threshold distance from the closest corresponding pixel of the annotated reference map, etc., or any combination thereof. If the alignment score is within an acceptable tolerance range, it is determined that alignment of the annotated image with the annotated reference map has been obtained an the translation and rotation applied to obtain the alignment are determined in order to determine the autonomous ground vehicle's position and/or orientation. If the alignment score is not within an acceptable tolerance range, the annotated image is repositioned relative to the annotated reference map and the alignment score of the new relative positioning is determined and the steps are repeated until alignment of the annotated image with the annotated reference map is obtained.

Certain embodiments of the present disclosure can also provide systems and methods for training a network for detecting the environmental features in images. Training image datasets can be created and then utilized to train a network or system (e.g., a deep learning model), which can be used to detect the environmental features as described herein.

In creating the training datasets, images captured by autonomous ground vehicles during operation can be hand annotated to generate pairwise datasets containing the front camera image of the scene and the corresponding binary edge map of the scene. Alternatively, synthetic datasets can be created based on simulated operation of an autonomous ground vehicle. During simulated operation, a line segment detection algorithm can be performed on a bird's-eye camera image that is available in simulation. The depth of the lines can be given by the depth channel of the bird's-eye image and can be ray-casted back to the front camera optical frame to get the binary edge image of the line features in the environment. These pairwise camera and binary images can then be used to train a network or system such as a deep learning model.

The created datasets can be used to train a network (e.g., pix2pix network) to detect the environmental features and generate the annotated binary image, which include the annotated line segments in the captured camera image by posing the problem as an image to image translation problem. For example, the network can be trained using a conditional generative adversarial network. Generator and discriminator networks can be utilized, where the generator network is conditioned on captured camera images and the output of the generator can include the annotated the binary image. The discriminator is configured to output a probability of the image being real. The trained generator model can then be utilized to detect the environmental features of the captured images of the autonomous ground vehicle.

Figure 10:
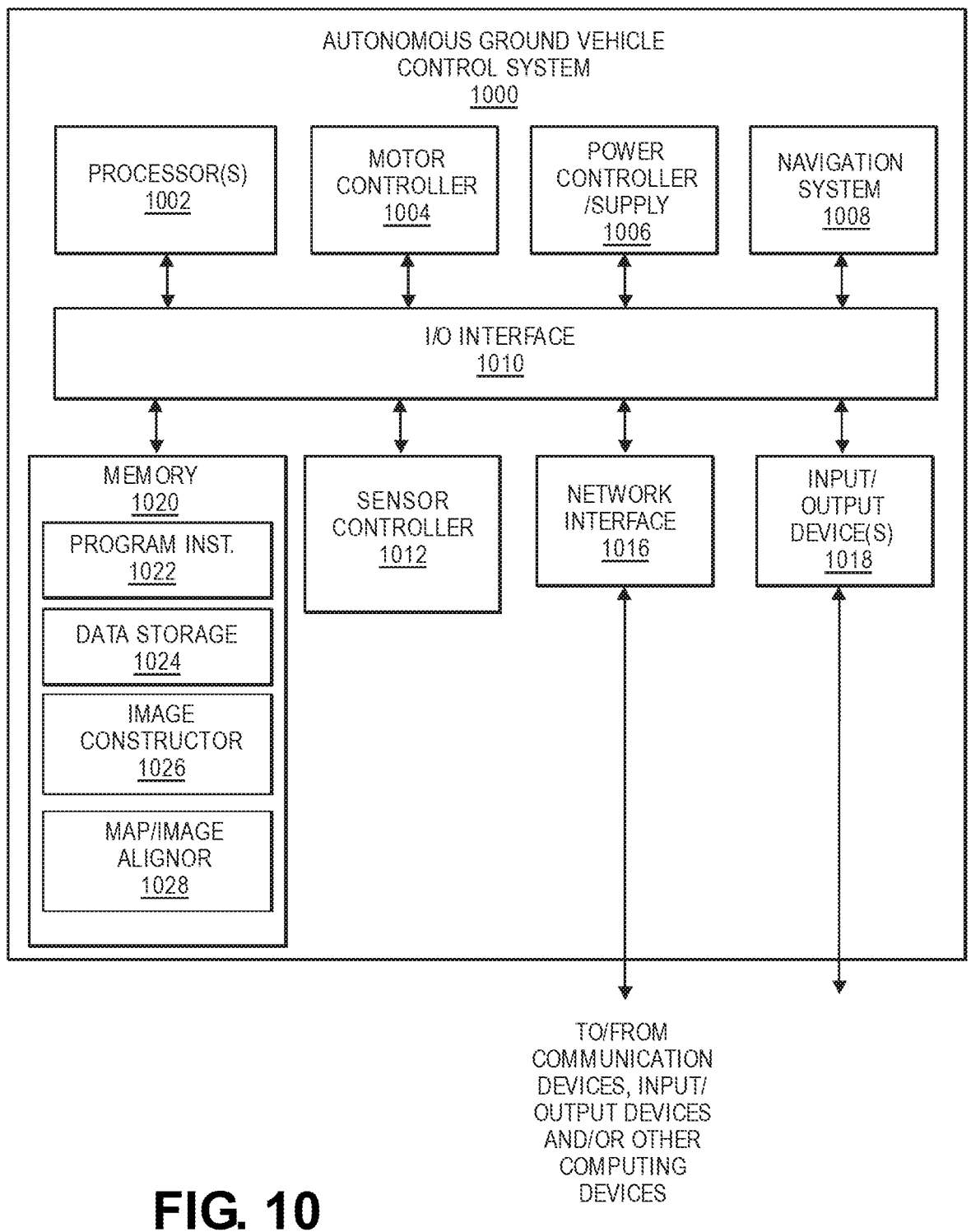
FIG. 10 is an exemplary autonomous ground vehicle control system, in accordance with embodiments of the present disclosure.

FIG. 10 is a block diagram illustrating various components of an exemplary autonomous ground vehicle control system 1000, in accordance with embodiments of the present disclosure.

In various examples, the block diagram may be illustrative of one or more aspects of autonomous ground vehicle control system 1000 that may be used to implement the various systems and methods discussed herein and/or to control operation of an autonomous ground vehicle discussed herein. In the illustrated implementation, autonomous ground vehicle control system 1000 includes one or more processors 1002, coupled to a memory, e.g., a non-transitory computer readable storage medium 1020, via input/output (I/O) interface 1010. Autonomous ground vehicle control system 1000 also includes motor controllers 1004, such as electronic speed controls (ESCs) or motor controllers, power modules 1006 and/or navigation system 1008. Autonomous ground vehicle control system 1000 further includes network interface 1016, and one or more input/output devices 1018.

In various implementations, autonomous ground vehicle control system 1000 may be a uniprocessor system including one processor 1002, or a multiprocessor system including several processors 1002 (e.g., two, four, eight, or another suitable number). Processor(s) 1002 may be any suitable processor capable of executing instructions. For example, in various implementations, processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor 1002 may commonly, but not necessarily, implement the same ISA.

Non-transitory computer readable storage medium 1020 may be configured to store executable instructions, data, navigation routes, flight control parameters, sensor information, occupancy maps, and/or data items accessible by processor(s) 1002. In various implementations, non-transitory computer readable storage medium 1020 may be implemented using any suitable memory technology, such as static random access memory (SRAM), synchronous dynamic RAM (SDRAM), nonvolatile/flash-type memory, or any other type of memory. In the exemplary embodiments, program instructions and data implementing desired functions, such as those described herein, are shown stored within non-transitory computer readable storage medium 1020 as program instructions 1022, data storage 1024, image constructor 1026, and map/image align or 1028, respectively. In other implementations, program instructions, data, sensor information, occupancy maps, and/or flight controls may be received, sent, or stored upon different types of computer-accessible media, such as non-transitory media, or on similar media separate from non-transitory computer readable storage medium 1020 or autonomous ground vehicle control system 1000. Generally, a non-transitory, computer readable storage medium may include storage media or memory media such as magnetic or optical media, e.g., disk or CD/DVD-ROM, coupled to autonomous ground vehicle control system 1000 via I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface 1016.

According to certain embodiments of the present disclosure, I/O interface 1010 may be configured to coordinate I/O traffic between processor(s) 1002, non-transitory computer readable storage medium 1020, and any peripheral devices, the network interface or other peripheral interfaces, such as input/output devices 1018. In some embodiments, I/O interface 1010 may perform any necessary protocol, timing or other data transformations to convert data signals from one component (e.g., non-transitory computer readable storage medium 1020) into a format suitable for use by another component (e.g., processor(s) 1002). In some embodiments, I/O interface 1010 may include support for devices attached through various types of peripheral buses, such as a variant of the Peripheral Component Interconnect (PCI) bus standard or the Universal Serial Bus (USB) standard, for example. In some embodiments, the function of I/O interface 1010 may be split into two or more separate components, such as a north bridge and a south bridge, for example. Also, in some implementations, some or all of the functionality of I/O interface 1010, such as an interface to non-transitory computer readable storage medium 1020, may be incorporated directly into processor(s) 1002.

Motor controllers 1004 may communicate with navigation system 1008 and adjust the rotational speed, position, orientation, or other parameters of each motor, to propel the autonomous ground vehicle, and/or to perform one or more maneuvers and guide the autonomous ground vehicle along a navigation route.

Navigation system 1008 may include a global positioning system (GPS), indoor positioning system (IPS), or other similar system and/or sensors that can be used to navigate the autonomous ground vehicle to and/or from a location.

Network interface 1016 may be configured to allow data to be exchanged between autonomous ground vehicle control system 1000, other devices attached to a network, such as other computer systems (e.g., remote computing resources), and/or with autonomous ground vehicle control systems of other autonomous ground vehicle. For example, network interface 1016 may enable wireless communication between the autonomous ground vehicle and an autonomous ground vehicle control system that is implemented on one or more remote computing resources. For wireless communication, an antenna of the autonomous ground vehicle or other communication components may be utilized. As another example, network interface 1016 may enable wireless communication between numerous autonomous ground vehicles. In various implementations, network interface 1016 may support communication via wireless general data networks, such as a Wi-Fi network. For example, network interface 1016 may support communication via telecommunications networks, such as cellular communication networks, satellite networks, and the like.

Input/output devices 1018 may, in some exemplary embodiments, include one or more displays, imaging devices, thermal sensors, infrared sensors, time of flight sensors, accelerometers, pressure sensors, weather sensors, etc. Multiple input/output devices 1018 may be present and controlled by the autonomous ground vehicle control system 1000. One or more of these sensors may be utilized to implement the implementations described.

As shown in FIG. 10, the memory may include program instructions 1022, which may be configured to implement the exemplary routines and/or sub-routines described herein. Data storage 1024 may include various data stores for maintaining data items that may be provided for autonomous ground vehicle navigation, determining navigation routes, detecting objects, detecting object types, determining object dynamics, generating annotated reference maps, generating annotated images, generating semantic layers, generating semantic c-spaces, generating combined c-spaces, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that autonomous ground vehicle control system 1000 is merely illustrative and is not intended to limit the scope of the present disclosure. In particular, the computing system and devices may include any combination of hardware or software that can perform the indicated functions. Autonomous ground vehicle control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with autonomous ground vehicle control system 1000. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from autonomous ground vehicle control system 1000 may be transmitted to autonomous ground vehicle control system 1000 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other autonomous ground vehicle control system configurations.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7-9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
   at least one computing system including a first processor and first program instructions that, when executed by the first processor, cause the first processor to at least:
      receive map information of an unstructured environment;
      construct an overhead two dimensional representation of the unstructured environment based on the map information;
      identify a first plurality of environmental features based on the overhead two dimensional representation of the unstructured environment using at least one of a first line segment detector, a first segmented semantic map, or a first trained deep learning system; and
      construct an annotated overhead reference map of the unstructured environment, the annotated overhead reference map including a first plurality of line features corresponding to the first plurality of environmental features;
   an autonomous ground vehicle operating in the unstructured environment, the autonomous ground vehicle including:
      at least one image sensor; and
      a control system including a second processor and second program instructions that, when executed by the second processor, cause the second processor to at least:
         receive at least one image of the unstructured environment from the at least one image sensor;
         construct an overhead annotated image of the unstructured environment based on the at least one image of the unstructured environment, the annotated image including a plurality of second line features corresponding to a second plurality of identified environmental features;
         determine an alignment of the annotated image to the annotated overhead reference map;
         construct a second overhead annotated image of the unstructured environment;
         determine odometry information associated with operation of the autonomous ground vehicle since determination of the alignment of the annotated image to the annotated overhead reference map;
         determine, based at least in part on the odometry information and the alignment of the annotated image to the annotated overhead reference map, a second alignment of the second overhead annotated image of the unstructured environment to the annotated overhead reference map;
         determine a relative translation and a relative rotation utilized in determining the second alignment of the second annotated image to the annotated overhead reference map; and determine at least one of a position and an orientation of the autonomous ground vehicle based on at least one of the relative translation and the relative rotation.

2. The system of claim 1, wherein the unstructured environment does not include lane markings and road markings.

3. The system of claim 1, wherein the first plurality of environmental features and the second plurality of environmental features include at least one of:
   a boundary of a sidewalk,
   a crack in the sidewalk,
   a boundary of a lawn,
   a boundary of a driveway, or
   a boundary of a road.

4. The system of claim 1, wherein the at least one image is a perspective view image and construction of the overhead annotated image of the unstructured environment includes at least one of:
   identifying the second plurality of identified environmental features in the at least one image, annotating the second plurality of identified environmental features with the plurality of second line features in the at least one image, and transforming the at least one image to a first overhead bird's-eye view image to generate the overhead annotated image; or
   transforming the at least one image to a second overhead bird's-eye view image, identifying the second plurality of identified environmental features in the second overhead bird's-eye view image, and annotating the second plurality of identified environmental features with the plurality of second line features to generate the overhead annotated image.

5. A computer-implemented method, comprising:
   constructing an overhead annotated reference map of an unstructured environment, the overhead annotated reference map including a first plurality of line features corresponding to a first plurality of environmental features;
   constructing an overhead annotated image of the unstructured environment from a first plurality of perspective view images, the overhead annotated image including a second plurality of line features corresponding to a second plurality of environmental features;
   aligning the overhead annotated image of the unstructured environment to the overhead annotated reference map of the unstructured environment;
   constructing a second overhead annotated image of the unstructured environment;
   determining odometry information associated with operation of an autonomous ground vehicle since the alignment of the overhead annotated image of the unstructured environment with the overhead annotated reference map of the unstructured environment was determined;
   aligning, based at least in part on the odometry information and the alignment of the overhead annotated image of the unstructured environment with the overhead annotated reference map of the unstructured environment, the second overhead annotated image of the unstructured environment to the overhead annotated reference map of the unstructured environment; and
   determining at least one of a position and an orientation of the autonomous ground vehicle based at least in part on the aligning of the second overhead annotated image of the unstructured environment to the overhead annotated reference map of the unstructured environment.

6. The computer-implemented method of claim 5, wherein at least the constructing of the overhead annotated image and the aligning of the overhead annotated image to the overhead annotated reference map are performed during operation of the autonomous ground vehicle.

7. The computer-implemented method of claim 5, wherein constructing the overhead annotated image of the unstructured environment includes, at least one of:
   identifying the second plurality of environmental features in the first plurality of perspective view images, annotating the second plurality of environmental features with the plurality of second line features in the first plurality of perspective view images, and transforming the first plurality of perspective view images to a first overhead bird's-eye view image to generate the overhead annotated image; or
   transforming the first plurality of perspective view images to a second overhead bird's-eye view image, identifying the second plurality of environmental features in the second overhead bird's-eye view image, and annotating the second plurality of environmental features with the plurality of second line features in the second overhead bird's-eye view image to generate the overhead annotated image.

8. The computer-implemented method of claim 7, wherein identifying the second plurality of environmental features in the first plurality of perspective view images or identifying the second plurality of environmental features in the second overhead bird's-eye view image includes, at least, applying at least one of a line segment detector, a segmented semantic map of the unstructured environment, or a trained deep learning system to the base image of the unstructured environment.

9. The computer-implemented method of claim 7, wherein constructing the overhead annotated image of the unstructured environment further includes, at least:
   determining first depth information associated with at least one of the first plurality of images; and
   constructing the first overhead bird's-eye view image or the second overhead bird's-eye view image based on at least the first plurality of perspective view images and the first depth information.

10. The computer-implemented method of claim 8, wherein constructing the overhead annotated image of the unstructured environment further includes, at least:
    receiving a second plurality of images of the unstructured environment;
    determining second depth information associated with at least one of the second plurality of images;
    constructing a third overhead bird's-eye view image based on at least the second plurality of images and the second depth information;
    determining odometry information based on data provided by a plurality of sensors of the autonomous ground vehicle; and
    constructing the overhead annotated image by utilizing the odometry information to combine the third overhead bird's-eye view image with at least one of the first overhead bird's-eye view image and the second overhead bird's-eye view image.

11. The computer-implemented method of claim 10, wherein the first plurality of images are obtained while the autonomous ground vehicle is disposed at a first location and the second plurality of images are obtained while the autonomous ground vehicle is disposed at a second location, the first location and the second location being different.

12. The computer-implemented method of claim 5, wherein aligning the overhead annotated image of the unstructured environment to the overhead annotated reference map of the unstructured environment includes, at least:
    positioning the overhead annotated image of the unstructured environment relative to the overhead annotated reference map of the unstructured environment at a first relative positioning;
    determining an alignment score associated with the positioning of the overhead annotated image relative to the overhead annotated reference map at the first relative positioning;
    comparing the alignment score against a threshold value to determine alignment of the overhead annotated image of the unstructured environment with the overhead annotated reference map of the unstructured environment; and
    determining a relative translation and a relative rotation utilized to obtain the alignment of the overhead annotated image of the unstructured environment with the overhead annotated reference map of the unstructured environment.

13. The computer-implemented method of claim 12, wherein the overhead annotated reference map includes a first binary representation of the unstructured environment, the first binary representation including non-zero values corresponding to the first plurality of line features;
    and wherein the overhead annotated image includes a second binary representation of the unstructured environment, the second binary representation including non-zero values corresponding to the second plurality of line features.

14. The computer-implemented method of claim 13, wherein the alignment score includes at least one of:
    an aggregate distance indicator,
    a number of pixels in the second binary representation that are disposed at a point that is less than a first relative distance threshold, or
    a ratio of the number of pixels in the second binary representation that are disposed at a location that is less than a second relative distance threshold to a number of pixels in the second binary representation that are disposed at a location that is greater than the second relative distance threshold.

15. An autonomous ground vehicle, comprising:
    at least one image sensor to capture at least a first perspective view image and a second perspective view image;
    at least one positional sensor to provide odometry information; and
    a control system including a processor and program instructions that, when executed by the processor, cause the processor to at least:
        receive an overhead annotated reference map having a first plurality of line features of an unstructured environment, the first plurality of line features corresponding to a plurality of environmental features in the unstructured environment,
        construct, based at least in part on the first perspective view image, an overhead annotated image of the unstructured environment having a second plurality of line features;
        determine a translation and a rotation to align the overhead annotated image to the overhead annotated reference map;
        construct, based at least in part on the second perspective view image, a second overhead annotated image of the unstructured environment having a third plurality of line features;
        obtain first odometry information from the at least one positional sensor since alignment of the overhead annotated image to the overhead annotated reference map;
        determine, based at least in part on the first odometry information and the alignment of the overhead annotated image to the overhead annotated reference map, a second translation and a second rotation to align the second overhead annotated image to the overhead annotated reference map; and
        determine at least one of a position and an orientation of the autonomous ground vehicle based at least in part on the second translation and the second rotation.

16. The autonomous ground vehicle of claim 15, wherein the at least one positional sensor includes at least one of:
    an image sensor,
    an accelerometer,
    a gyroscope, or
    a compass.

17. The autonomous ground vehicle of claim 15, wherein the program instructions include further instructions that, when executed by the processor, cause the processor to at least determine a first relative positioning of the overhead annotated image to the overhead annotated reference map based at least in part on the odometry information.

18. The autonomous ground vehicle of claim 15, wherein the program instructions include further instructions that, when executed by the processor, cause the processor to at least identify, prior to a determination of the translation and the rotation to align the overhead annotated image to the overhead annotated reference map, at least one area of the overhead annotated reference map where the first plurality of line features and the second plurality of line features prevent aligning the overhead annotated image of the unstructured environment to the overhead annotated reference map of the unstructured environment in a first direction.

19. The autonomous ground vehicle of claim 15, wherein the program instructions include further instructions that, when executed by the processor, cause the processor to at least update the overhead annotated reference map based on a determination of the translation and the rotation to align the overhead annotated image to the overhead annotated reference map.

* * * * *